(12) United States Patent
Nangare et al.

(10) Patent No.: US 11,145,331 B1
(45) Date of Patent: Oct. 12, 2021

(54) SYSTEMS AND METHODS FOR ADAPTATION OF A TWO-DIMENSIONAL MAGNETIC RECORDING CHANNEL

(71) Applicant: Marvell Asia Pte, Ltd., Singapore (SG)

(72) Inventors: Nitin Nangare, Sunnyvale, CA (US); Jinlu Shen, Pullman, WA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/084,370

(22) Filed: Oct. 29, 2020

Related U.S. Application Data

(60) Provisional application No. 62/943,699, filed on Dec. 4, 2019, provisional application No. 62/943,692, filed on Dec. 4, 2019, provisional application No. 62/927,588, filed on Oct. 29, 2019, provisional application No. 62/927,591, filed on Oct. 29, 2019.

(51) Int. Cl.
*G11B 5/035* (2006.01)
*G11B 20/10* (2006.01)

(52) U.S. Cl.
CPC .............................. *G11B 20/10046* (2013.01)

(58) Field of Classification Search
CPC ............ G11B 5/09; G11B 20/10; G11B 5/035; G11B 20/10046; G11B 20/10027
USPC ............................................................ 360/65
See application file for complete search history.

(56) References Cited

U.S. PATENT DOCUMENTS 9,123,356 B2 * 9/2015 Sankaranarayanan ... G11B 5/09

* cited by examiner

*Primary Examiner* — Nabil Z Hindi

(57) ABSTRACT

Systems and methods for adaptation of a two-dimensional magnetic recording (TDMR) channel are provided. Read-back signals from respective read sensors of a TDMR channel are received at an equalizer, the read-back signals corresponding to a digital signal value. A log-likelihood ratio (LLR) signal is generated based at least in part on the read-back signals. A cross-entropy value is generated indicative of a mismatch between a probability of detected bit and a probability of the true recorded bit. The equalizer is adapted by setting an equalizer parameter to a value that corresponds to a minimum cross-entropy value from among the computed cross-entropy value and one or more previously computed cross-entropy values, to decrease a read-back bit error rate for the TDMR channel.

36 Claims, 24 Drawing Sheets

SYSTEMS AND METHODS FOR ADAPTATION OF A TWO-DIMENSIONAL MAGNETIC RECORDING CHANNEL

CROSS-REFERENCE TO RELATED APPLICATIONS

This disclosure claims the benefit under 35 U.S.C. § 119(e) of commonly-assigned U.S. Provisional Patent Applications Nos. 62/927,588, filed Oct. 29, 2019; 62/927,591, filed Oct. 29, 2019; 62/943,692, filed Dec. 4, 2019; and 62/943,699, filed Dec. 4, 2019. Each of the aforementioned provisional patent applications is hereby incorporated by reference herein in its respective entirety.

FIELD OF USE

This disclosure relates to hard disk drive (HDD) technology, and specifically, to systems and methods for adaptation of a two-dimensional magnetic recording (TDMR) read-back channel of a HDD to decrease a read-back bit error rate, thereby facilitating an increase in the areal density with which data can be stored on the HDD, thus increasing the data storage capacity of the HDD.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In magnetic recording, reading and writing are performed by a head of an HDD that moves relative to the surface of the storage medium and writes data to, or reads data from, circular data tracks on a magnetic disk. In order to increase recording densities, it is desirable to shrink the bit cell, or area of disk surface in which a single bit is recorded. Shrinking the bit cell, however, increases inter-symbol interference (ISI) from data recorded on the media, thereby increasing the bit error rate (BER) and decreasing the reliability of read-back data. An increased BER also effectively reduces the rate at which data can be read back, owing to the overhead inherent in error-detection or error-correction techniques employed to compensate for the increased BER, and/or owing to repeat read-back attempts that may be necessary in order to accurately read-back data after erroneous data read-back attempts.

A decrease of the read-back BER in HDDs enables data to be more reliably stored increased areal-density on an HDD, thus providing higher capacity in the HDD, and can increase the rate at which data can be read back.

Two-dimensional magnetic recording (TDMR) is another technique that has been developed in an effort to increase storage capacity in HDDs. TDMR employs a read-back technique that allows for greater storage capacity by combining signals simultaneously obtained from multiple read-back heads to enhance the accuracy of reading back data from one or more data tracks. A TDMR read-back channel includes an equalizer to mitigate the negative impact that noise has on the read-back channel signal integrity, and on the accuracy and reliability in reading back digital data values from the storage medium. Some TDMR read-back channels utilize minimum-mean-squared-error (MMSE) as a cost function to adapt the equalizer to further improve BER performance.

SUMMARY

Embodiments described herein provide systems and methods for adaptation of various components, such as an equalizer, a channel estimator, and/or the like, of a two-dimensional magnetic recording (TDMR) channel. According to one such method, read-back signals are received at an equalizer from respective read sensors of a TDMR channel, the read-back signals corresponding to a digital signal value. A log-likelihood ratio (LLR) signal is generated based at least in part on the read-back signals. A cross-entropy value is computed indicative of a mismatch between a probability of detected bit and a probability of the true recorded bit. The equalizer is adapted by setting an equalizer parameter to a value that corresponds to a minimum cross-entropy value from among the computed cross-entropy value and one or more previously computed cross-entropy values, to decrease a read-back bit error rate for the TDMR channel.

In another aspect, the equalizer comprises a plurality of filter taps having a plurality of coefficients, respectively, and the adapting the equalizer based on the cross-entropy value comprises setting one or more of the plurality of coefficients to one or more respective values that correspond to a minimum cross-entropy value from among the computed cross-entropy value and one or more previously computed cross-entropy values.

In a further aspect, the read-back signals contain inter-symbol interference (ISI) from data recorded on the media, and the LLR signal is generated by feeding an output of the equalizer through a detector configured to remove inter-symbol interference.

Generating the LLR signal, in some examples, comprises generating branch metrics at a Viterbi detector based on an output of the equalizer, and generating the LLR signal at a soft output Viterbi algorithm module based on the branch metrics, the LLR signal being a soft output indicative of both a detected digital bit value and a reliability of a likelihood that the detected digital bit value is accurate.

In a further aspect, computing the cross-entropy value comprises receiving, at the equalizer via the read sensors of the TDMR channel, a plurality of read-back signals corresponding to a plurality of digital bit values stored on a recording medium, the plurality of digital bit values representing a set of training data. A plurality of cross-entropy values are computed for the plurality of digital bit values, respectively. An average cross-entropy function is computed based on the plurality of cross-entropy values. The average cross-entropy function is utilized as a cost function for the adapting of the equalizer.

Computing the cross-entropy value, in another example, comprises computing a gradient of between cross-entropy values and values of coefficients of filter taps of the equalizer.

In another aspect, the TDMR channel comprises a branch metric unit (BMU) and a path metric unit (PMU), and computing the gradient between the cross-entropy values and the values of the coefficients of the filter taps of the equalizer comprises computing a gradient between LLR values and values of a path metric difference (PMD) of the PMU, a gradient between the values of the PMD and values of a branch metric (BM) of the BMU, and a gradient between the values of the BM and the values of the coefficients of the filter taps.

The BMU, in some instances, may comprise a Viterbi detector configured to generate branch metrics based on an output of the equalizer.

In a further example, the PMU is configured to execute a soft output Viterbi algorithm (SOVA) based on the branch metrics to generate the LLR signal, the LLR signal being a soft output indicative of both a detected digital bit value and a reliability of a likelihood that the detected digital bit value is accurate.

Adapting the equalizer based on the cross-entropy value, in some examples, comprises setting one or more of the coefficients to a value that corresponds to a minimum cross-entropy according to the computed gradient.

The read-back signals comprise, in some instances, error-correcting codes and the method further comprises computing, at an error-correcting decoder, the digital signal value based on the error-correcting codes of the read-back signals.

The TDMR channel may comprise a channel estimation filter having a plurality of filter tap coefficients, and the method may further comprise adapting the filter tap coefficients of the channel estimation filter based on the computed cross-entropy.

The equalizer, as another example, may be a nonlinear equalizer configured to perform nonlinear equalization upon the read-back signals to reduce non-linear noise originating from non-linear noise sources. The nonlinear equalizer may comprise a neural network including a plurality of hidden node layers, with each hidden node layer comprising a plurality of hidden nodes, with the method further comprising executing, at the plurality of hidden nodes, activation functions, such as hyperbolic tangent function activation functions (tanh), thah activation functions, rectified linear unit (ReLU) activation functions, leaky-ReLU activation functions, or the like.

In another example, the method further comprises estimating a plurality of bit error rates for a plurality of configurations of the nonlinear equalizer, respectively, each of the plurality of configurations corresponding to a number of hidden node layers having respective numbers of hidden nodes. The non-linear equalizer may be configured to have one of the plurality of configurations corresponds to a minimum bit error rate value from among the plurality of bit error rates.

The method, in some aspects, further comprises generating, based on a probability distribution function (PDF) of noise detected at an output of the nonlinear equalizer, a curve fitting model comprising a plurality of branch metric parameters. The curve fitting model is configured to be utilized as a modified branch metric of the BMU.

In some aspects, the method further comprises adapting the values of one or more of the plurality of branch metric parameters to minimize the cross-entropy signal by setting values of the branch metric parameters to values that correspond to a minimum cross-entropy value from among the computed cross-entropy value and one or more previously computed cross-entropy values.

The equalizer, in some instances, is configured to perform linear equalization upon the read-back signals to reduce linear noise originating from linear noise sources.

In accordance with another aspect, the present disclosure provides a two-dimensional magnetic recording (TDMR) read-back channel. The TDMR read-back channel comprises equalizer circuitry configured to execute an equalization algorithm upon read-back signals received from respective read sensors. The read-back signals correspond to a digital signal value. The read-back channel also comprises soft sequence detector for an ISI channel circuitry configured to generate a log likelihood ratio (LLR) signal based at least in part on the equalized read-back signals. Cost function circuitry is configured to compute a cross-entropy value indicative of a mismatch between a probability of detected bit and a probability of the true recorded bit, and adapt the equalization algorithm by setting an equalizer parameter to a value that corresponds to a minimum cross-entropy value from among the computed cross entropy value and one or more previously computed cross-entropy values, to decrease a read-back bit error rate for the TDMR channel.

In another aspect, the equalizer circuitry comprises a plurality of filter taps having a plurality of coefficients, respectively, and the cost function circuitry is further configured to adapt the equalization algorithm based on the cross-entropy value by setting one or more of the plurality of coefficients to one or more respective values that correspond to a minimum cross-entropy value from among the computed cross-entropy value and one or more previously computed cross-entropy values.

The read-back signals, in one example, contain inter-symbol interference (ISI) from data recorded on the media, and the LLR signal is generated by feeding an output of the equalizer through the soft sequence detector for an ISI channel circuitry configured to remove inter-symbol interference.

In a further aspect, the soft sequence detector for an ISI channel circuitry comprises Viterbi decoder circuitry that includes Viterbi detector circuitry and soft output Viterbi algorithm circuitry. The soft sequence detector for an ISI channel circuitry is configured to generate the LLR signal by generating branch metrics at a Viterbi detector based on an output of the equalizer, and generating the LLR signal at a soft output Viterbi algorithm module based on the branch metrics. The LLR signal is a soft output indicative of both a detected digital bit value and a reliability of a likelihood that the detected digital bit value is accurate.

The equalizer, in some aspects, is further configured to receive, via the read sensors of the TDMR channel, a plurality of read-back signals corresponding to a plurality of digital bit values stored on a recording medium, the plurality of digital bit values representing a set of training data. The cost function circuitry is further configured to compute the cross entropy value by computing a plurality of cross-entropy values for the plurality of digital bit values, respectively. An average cross-entropy function is computed based on the plurality of cross-entropy values and is utilized as a cost function for the adapting of the equalizer.

The cost function circuitry, in some examples, is further configured to compute the cross entropy value by computing a gradient between cross-entropy values and values of coefficients of filter taps of the equalizer circuitry.

In another example, the Viterbi decoder circuitry comprises branch metric unit (BMU) circuitry and path metric unit (PMU) circuitry. The cost function circuitry is further configured to compute the gradient between the cross-entropy values and the values of the coefficients of the filter taps of the equalizer by computing a gradient between LLR signal values and values of a path metric difference (PMD) of the PMU circuitry, a gradient between the values of the PMD and values of a branch metric (BM) of the BMU circuitry, and a gradient between the values of the BM and values of the coefficients of the filter taps.

The BMU circuitry, in some examples, comprises Viterbi detector circuitry configured to execute a Viterbi detection algorithm by generating branch metrics based on an output of the equalizer circuitry.

In a further aspect, the PMU circuitry further comprises soft output Viterbi algorithm (SOVA) circuitry configured to execute the SOVA based on the branch metrics to generate the LLR signal, the LLR signal being a soft output indicative of both a decoded digital bit value and a reliability of a likelihood that the decoded digital bit value is accurate.

The cost function circuitry, for instance, may be further configured to adapt the equalizer based on the cross-entropy value by setting one or more of the coefficients to a value that corresponds to a minimum cross-entropy according to the computed gradient.

In another example, the read-back signals comprise error-correcting codes, and the TDMR read-back channel further comprises error-correcting decoder circuitry configured to compute the digital signal value based on the error correcting codes, and transmit the digital signal value to the cost function circuitry.

The TDMR read-back channel, in some instances, further comprises channel estimation filter circuitry having a plurality of filter tap coefficients, with the cost function circuitry being further configured to adapt the filter tap coefficients of the channel estimation filter based on the computed cross-entropy.

The equalizer circuitry comprises, in some examples, non-linear equalizer circuitry configured to perform a non-linear equalization algorithm upon the read-back signals to reduce non-linear noise originating from non-linear noise sources. The nonlinear equalizer circuitry may comprise a neural network including a plurality of hidden node layers, with each hidden node layer comprising a plurality of hidden nodes, and with each hidden node being configured to execute respective activation functions, such as hyperbolic tangent function activation functions (tanh), thah activation functions, rectified linear unit (ReLU) activation functions, leaky-ReLU activation functions, or the like.

The TDMR read-back channel further comprises, in one aspect, bit error rate estimator circuitry configured to estimate a plurality of bit error rates for a plurality of configurations of the nonlinear equalizer circuitry, respectively, the plurality of configurations corresponding to a number of hidden node layers having respective numbers of hidden nodes. The non-linear equalizer is then configured to have one of the plurality of configurations that corresponds to a minimum bit error rate value from among the plurality of bit error rates.

The TDMR read-back channel further comprises, in a further aspect, branch metric parameter generation circuitry configured to generate, based on a probability distribution function (PDF) of noise detected at an output of the non-linear equalizer, a curve fitting model comprising a plurality of branch metric parameters, and configure the curve fitting model to be utilize as a modified branch metric of the BMU.

The cost function circuitry is further configured, in some aspects, to adapt the values of one or more of the plurality of branch metric parameters to minimize the cross-entropy signal by setting values of the branch metric parameters to values that correspond to a minimum cross-entropy value from among the computed cross-entropy value and one or more previously computed cross-entropy values.

In yet a further aspect, the equalizer circuitry is further configured to perform a linear equalization algorithm upon the read-back signals to reduce linear noise originating from linear noise sources.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

In accordance with implementations of the present disclosure, systems and methods for adaptation of a TDMR read-back channel of an HDD are disclosed. In particular, the present disclosure provides a variety of systems and methods that employ a variety of techniques that utilize a cross-entropy cost function, instead of an MMSE cost function, to adapt a variety of parameters of read-back TDMR channel components, such as a linear equalizer, a non-linear equalizer, a channel estimator, and/or a soft sequence detector for an ISI channel. As the present disclosure demonstrates, utilizing the cross-entropy cost function based on LLR signals is more effective than utilizing the MMSE cost function based on equalizer output in achieving a lower BER, at the output of a soft sequence detector for an ISI channel and for the read-back channel overall. In contrast to utilizing a MMSE cost function to adapt a TDMR channel to minimize the error between detected bits and the true or optimal bits, the present disclosure contemplates utilizing a cross-entropy cost function to adapt the TDMR channel to maximize the confidence or quality in decoded bits. As demonstrated herein, utilizing the cross-entropy cost function to minimize cross-entropy at various stages of the TDMR read-back channel yields an improved BER performance as compared to prior techniques, such as those that employ the MMSE cost function.

Cross-entropy-based adaptation of each stage of the TDMR read-back channel (e.g., the equalizer stage, the channel estimator stage, the soft sequence detector for an ISI channel stage) yields a corresponding improvement in BER performance for the TDMR channel, albeit at some cost of increased computational complexity. Depending upon the BER requirements and the computational complexity constraints for a given application, a system designer can select which stage(s) (e.g., an adaptive equalizer stage, an adaptive channel estimator stage, an adaptive soft sequence detector stage, or the like) of the TDMR channel to adapt to strike a balance between cost and performance.

The systems and methods disclosed herein improve BER performance in TDMR read-back channels of HDDs and enable data to be reliably stored with higher areal-density on HDDs, thus providing higher capacity in the HDDs. Decreasing the data read-back BER in accordance with the systems and methods herein also increases the rate at which data can be read back, because less overhead from error detection and/or error correction techniques may be needed to reliably read back data, and fewer repeat read-back attempts may be necessary in order to accurately read-back data.

Figure 1:
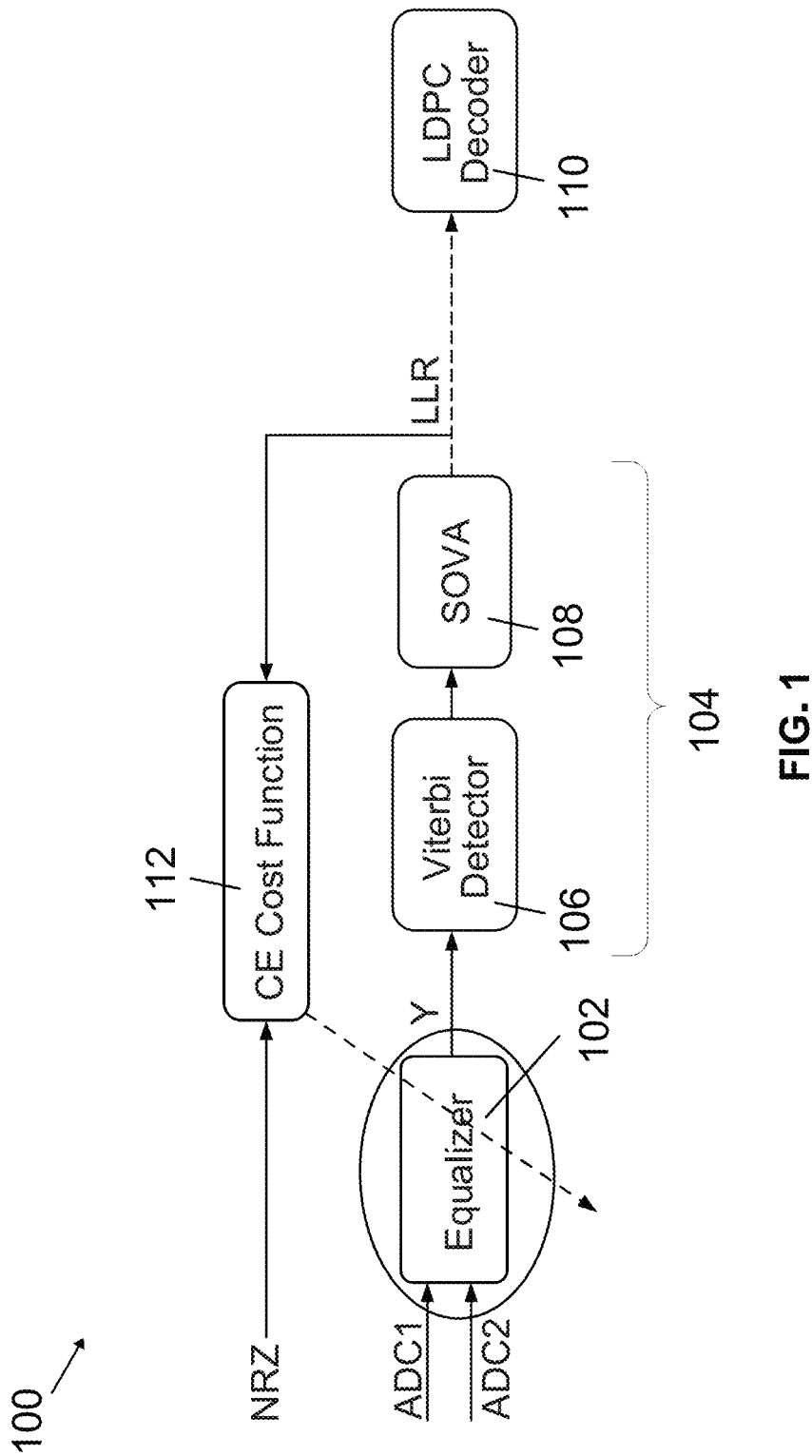
FIG. 1 is a schematic representation of a system for adaptation of an equalizer of a two-dimensional magnetic recording (TDMR) channel, in accordance with an embodiment of the present disclosure.

FIG. 1 is a schematic representation of a system 100 for adaptation of an equalizer of a TDMR read-back channel, in accordance with an embodiment of the present disclosure. The system 100 receives two read-back signals (ADC1, ACD2) obtained after analog-to digital conversion of signals captured by the read head (not shown in FIG. 1) of the TDMR channel. The read-back signals correspond to a digital signal value, such as logic zero or logic one. The goal of the system 100 is to accurately and reliably read-back a logic zero when the read-back signals in fact correspond to a logic zero, and accurately and reliably read-back a logic one when the read-back signals in fact correspond to a logic one, despite the negative effects of noise upon signal integrity.

The two ADC input signals are equalized at equalizer 102 configured to mitigate inter-symbol interference (ISI) coming from bits recorded on the storage media. Equalizer 102, in various embodiments, may be a linear equalizer configured to mitigate the effects of linear noise on read-back signal integrity and read-back performance, or a non-linear equalizer configured to mitigate the effects of non-linear noise on read-back signal integrity and read-back performance.

The output of equalizer 102 is then passed to a soft sequence detector for an ISI channel stage 104 configured to perform sequence detection in the presence of inter-symbol-interference (ISI) upon the signal output by equalizer 102, in examples where the ADC input signals are corrupted by inter-symbol-interference (ISI). The soft sequence detector for an ISI channel stage 104 may include any type of soft sequence detector for an ISI channel circuitry, such as Viterbi decoder circuitry shown in FIG. 1. The soft sequence detector for an ISI channel circuitry includes Viterbi detector circuitry 106, or another type of a branch metric unit (BMU), and soft output Viterbi algorithm (SOVA) circuitry 108, or another type of path metric unit (PMU). Based on the received output of the equalizer, the soft sequence detector for an ISI channel stage 104 generates an LLR signal. In the particular example shown in FIG. 1, the Viterbi detector circuitry 106 generates branch metrics based on the equalizer output and the SOVA circuitry 108 generates the LLR signal based on the generated branch metrics. In examples where the ADC input signals include error correction encoding, the SOVA circuitry 108 forwards the LLR signal to low density parity check (LDPC) decoder circuitry 110 or another type of error correction decoder circuitry which decodes the LLR into a bit value, employing error correction if needed. System 100 also includes cross-entropy cost function circuitry 112 configured to adapt equalizer 102, based on the LLR signal output by SOVA circuitry 108 and based on the digital value (formatted as a non-return-to-zero (NRZ) signal in the example of FIG. 1), which was obtained by LDPC decoder 110 after any decoding and necessary error correction has been performed based upon the received read-back signals (ADC1, ADC2). In particular, cross-entropy cost function circuitry 112 is configured to compute a cross-entropy value indicative of a mismatch between a probability of detected bit and a probability of the true recorded bit. Cross-entropy cost function circuitry 112 then adapts the equalizer by setting an equalizer parameter (e.g., one or more coefficients of filter taps of the equalizer) to a value that corresponds to a minimum cross-entropy value from among the computed cross-entropy value and one or more previously computed cross-entropy values, to decrease a read-back bit error rate for the TDMR channel. Modifications of filter coefficients described herein may be made on an individualized basis, modifying one or more coefficients at a time.

The following shows how to represent the probability of a bit being zero ($P_0$) and the probability of a bit being 1 ($P_1$) in terms of an LLR.

$$LLR = L = \log\left(\frac{P_1}{P_0}\right)$$

$$P_1 + P_0 = 1$$

$$P_0 = \frac{1}{(1 + e^L)}$$

$$P_1 = \frac{e^L}{(1 + e^L)}$$

The following shows how to compute cross-entropy between LLR and NRZ bit.

$$\text{Cross Entropy}(bit, LLR) = -P(bit = 0) \cdot \log(P_0) - P(bit = 1) \cdot \log(P_1)$$

$$\text{Cross Entropy}(bit, LLR) = -(1 - bit) \cdot \log(P_0) - bit \cdot \log(P_1)$$

$$\text{Cross Entropy} = Inf \quad \text{when} \begin{cases} bit = 0 & P_0 = 0 \\ bit = 1 & P_1 = 0 \end{cases}$$

$$\text{Cross Entropy} = 0 \quad \text{when} \begin{cases} bit = 0 & P_0 = 1 \\ bit = 1 & P_1 = 1 \end{cases}$$

When the true bit equals logic zero but the SOVA circuitry 108 indicates that $P_0$ equals zero, then cost (cross-entropy) approaches infinity (and vice versa). When the LLR signal output by SOVA circuitry 108 agrees with the true bit value, then cross-entropy equals zero. The cross-entropy is indicative of a mismatch between a probability of detected bit and a probability of the true recorded bit. Thus, minimizing cross-entropy (e.g., adapting the TDMR channel to drive cross-entropy away from infinity and towards zero) in the TDMR channel minimizes the mismatch between a probability of a detected bit and a probability of the true recorded bit and thus yields a high quality in bits that are detected by the channel. The cross-entropy cost function can therefore be used for adaptation and truly reflects the quality of the detected bits.

In some examples, to obtain a final cost function, equalizer 102 is configured to receive, via the read sensors of the TDMR channel, a multiple read-back signals corresponding to a multiple digital bit values stored on the recording medium, the digital bit values representing a set of training data. Cross-entropy cost function circuitry 112 is configured to compute respective cross-entropy values based on the digital bit values. Cross-entropy cost function circuitry 112 then computes an average cross-entropy function based on the multiple computed cross-entropy values, and utilizes the average cross-entropy function as a cost function for the adapting of the equalizer 102.

The gradient between cross-entropy and LLR can be computed by substituting $P_0$ and $P_1$ values into the cross-entropy equation.

$$\frac{\partial(CE)}{\partial(LLR)} = P_1 - bit = \begin{cases} P_1 & \text{when bit} = 0 \\ P_1 - 1 = -P_0 & \text{when bit} = 1 \end{cases}$$

LLR adaptation to minimize cross-entropy is given by:

$$LLR_{t+1} = LLR_t - \alpha \cdot P_1 \quad \text{if bit} = 0$$

$$LLR_{t+1} = LLR_t + \alpha \cdot P_0 \quad \text{if bit} = 1$$

A negative LLR means the probability that the detected bit has a value of zero is higher than the probability that the detected bit has a value of 1 and vice versa. $P_1$ and $P_0$ are positive probability values, and α is positive, so when the true bit equals zero then adaptation using cross-entropy will make LLR more strongly negative by an amount proportional to $P_1$ which is detectors probability of incorrect decision. Similarly, when the true bit equals one then adaptation using cross-entropy will make the LLR more strongly positive by an amount proportional to P0 which is detectors probability of incorrect decision. So higher the probability of incorrect decision by the detector, faster the adaptation circuitry tries to correct it. Eventually when cross-entropy is minimized, LLR for true bit equal to 0 becomes more negative and LLR for true bit equal to 1 becomes more positive. Hence proposed adaptation based on minimizing CE is equivalent to maximizing the likelihood of detected bits (Maximum likelihood (ML) adaptation) and thus also minimizes BER.

Equalizer 102 is adapted by adapting the coefficients of its finite-impulse response (FIR) filter taps. Cross-entropy is related to FIR taps via multiple intermediate parameters. In the particular example shown in FIG. 1, cross entropy depends on LLR, which depends on path-metric difference in SOVA circuitry 108, which depends on a branch metric in Viterbi detector circuitry 106 which depends on FIR filter taps of equalizer 102. Using the chain rule, gradients between all intermediate parameters can be computed, and then finally a gradient between cross-entropy and the FIR taps of equalizer 102 that are to be adapted can be computed as shown below.

FIR-Taps←BM←PMD←LLR←CE $$\frac{\partial(CE)}{\partial(2D\ FIR\ \text{Taps})} = \frac{\partial(BM)}{\partial(2D\ FIR\ \text{Taps})} \frac{\partial(PMD)}{\partial(BM)} \frac{\partial(LLR)}{\partial(PMD)} \frac{\partial(CE)}{\partial(LLR)}$$

Figure 2:
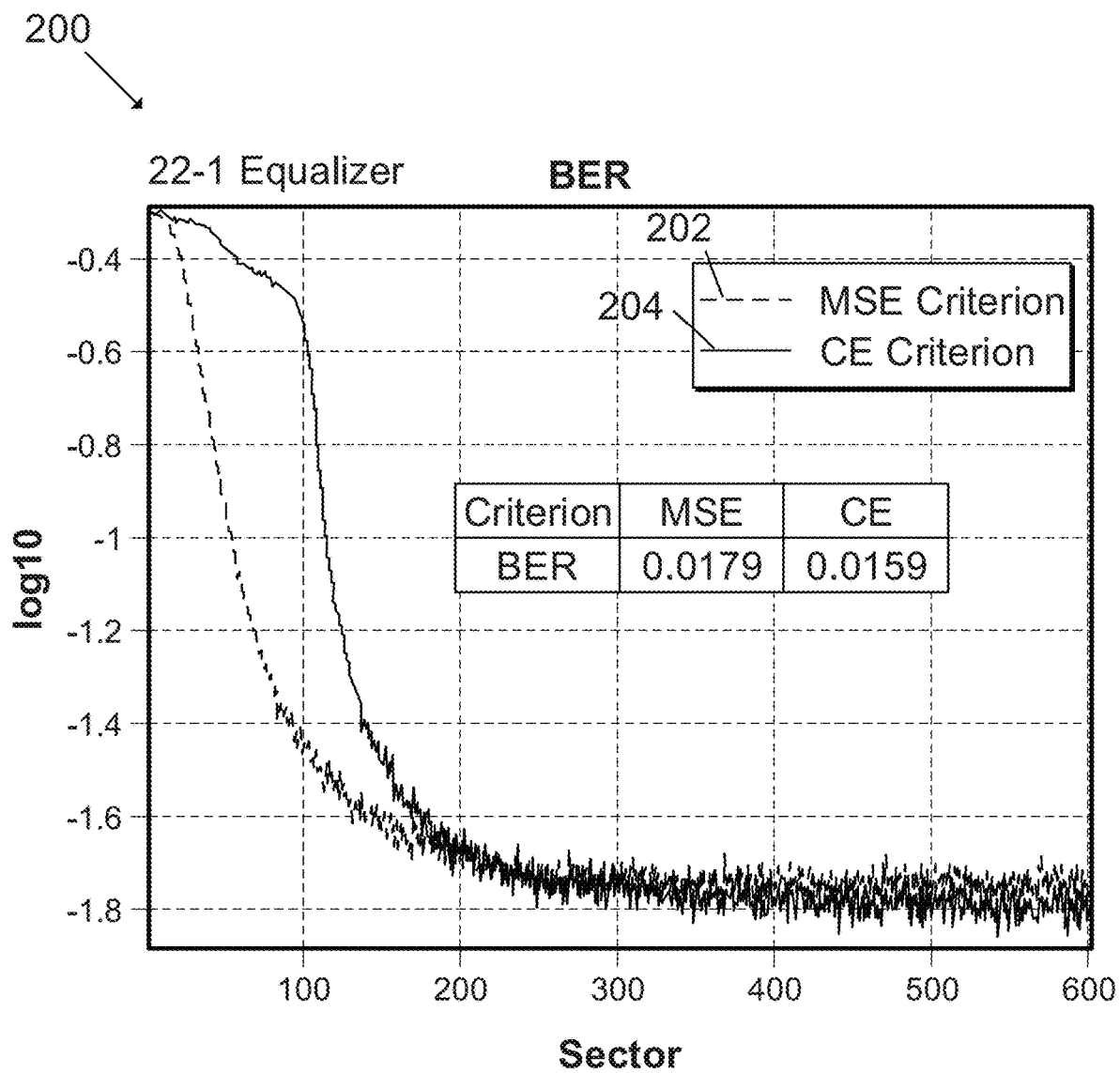
FIG. 2 is a graphical representation of how bit error rate changes over each sector adaptation of a linear equalizer utilizing two different cost functions, in accordance with an embodiment of the present disclosure.

FIG. 2 is a graphical representation 200 of how bit error rate performance in system 100 changes over each sector adaptation (e.g., adaptation based on sectors of a storage medium storing data read by way of TDMR read-back channel) of a linear equalizer utilizing two different cost functions (a MMSE cost function and a cross-entropy (CE) cost function), in accordance with an embodiment of the present disclosure. In particular, FIG. 2 was generated based on simulations that were run to test the cross-entropy based adaptation scheme described above in connection with FIG. 1 to determine how it performs and how much improvement it provides in BER over prior techniques. The simulations were executed with the following TDMR settings.

| TDMR Simulation Settings for FIG. 2 |
| --- |
| 2-reader TDMR system |
| Cross-track separation between two readers: 30% |
| 100 sector ADC samples captured for off-track position of 0%, with each sector being 39512 bits long |
| 100 sectors are cycled through repetitively |
| Adaptation batch size: 1024 |
| Off-track: 0% |
| Viterbi path memory length: 30 |
| SOVA trace back length: 20; SOVA traceback depth: 3 |
| Viterbi has 4 states |
| Adaptation criteria: cross-entropy vs. MMSE |

As illustrated in FIG. 2, utilizing cross-entropy as a cost function to adapt equalizer 102 achieves a lower BER (0.0159) than the BER (0.0179) that is achieved by utilizing MMSE as the cost function to adapt equalizer 102. That is, curve 204 (CE criterion) settles to a BER of 0.0159, whereas curve 202 (MMSE criterion) settles to a BER of 0.0179.

Figure 3:
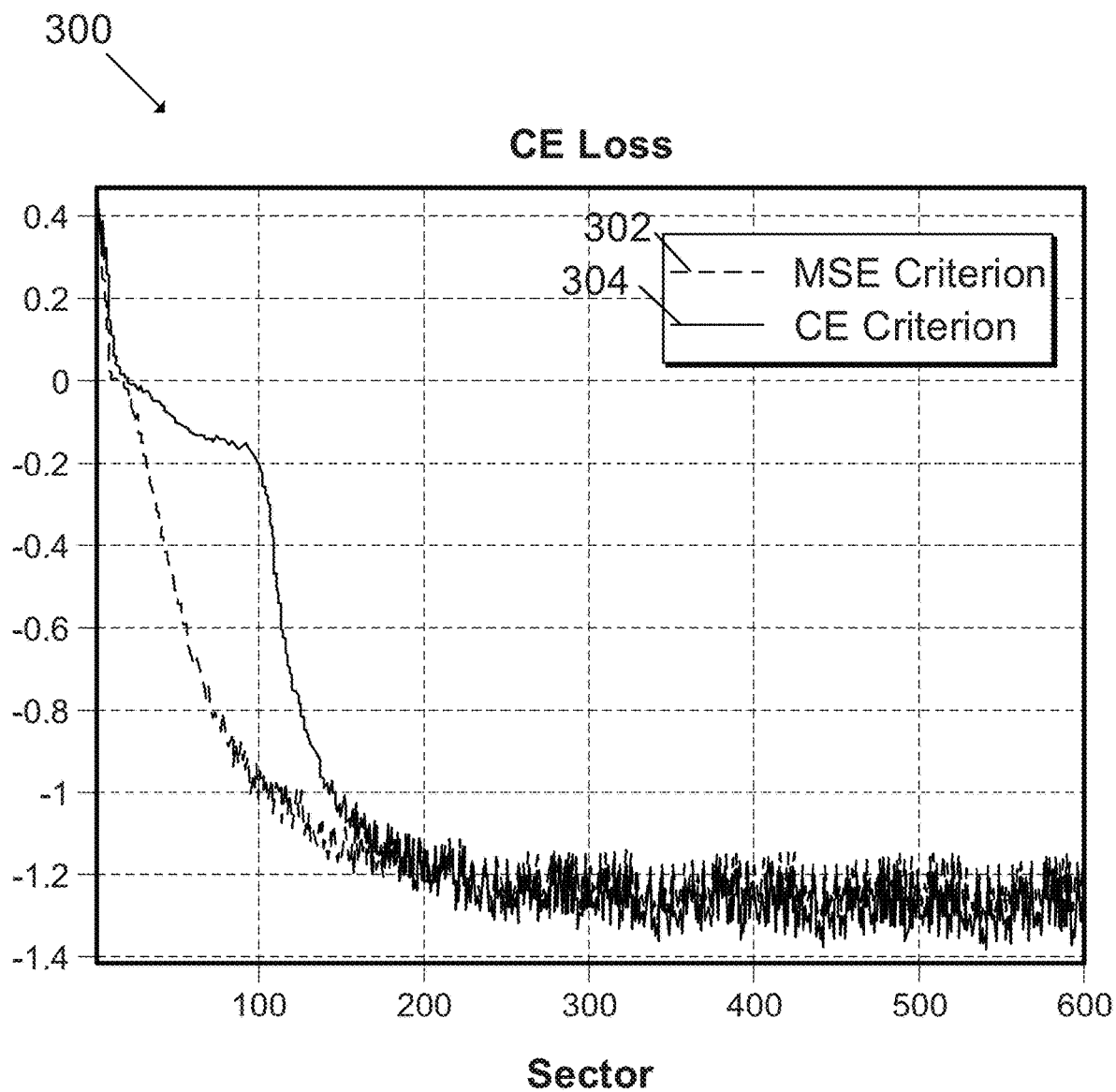
FIG. 3 is a graphical representation of how cross-entropy loss changes over each sector adaptation of a linear equalizer, in accordance with an embodiment of the present disclosure.

FIG. 3 is a graphical representation 300 of how cross-entropy changes over each sector adaptation of a linear version of equalizer 102, in accordance with an embodiment of the present disclosure. The adaptation in FIG. 3, in one example, may be performed during an offline procedure for training a TDMR channel of an HDD by sector. The horizontal axis of FIG. 3 represents the sector number, and the vertical axis of FIG. 3 represents the cross-entropy (or cross-entropy loss) detected for the respective sector during the adaptation process. Curve 304 (using cross-entropy as the cost function criterion) settles to a lower value than curve 302 (using MMSE as the cost function criterion). As is apparent when viewing FIG. 2 alongside FIG. 3, where the cross-entropy value is lower, the BER is also lower. Thus, minimizing cross-entropy correlates well with minimizing BER. Cross-entropy, therefore, is an effective cost function for adapting equalizer 102 to obtain minimal BER.

Figure 4:
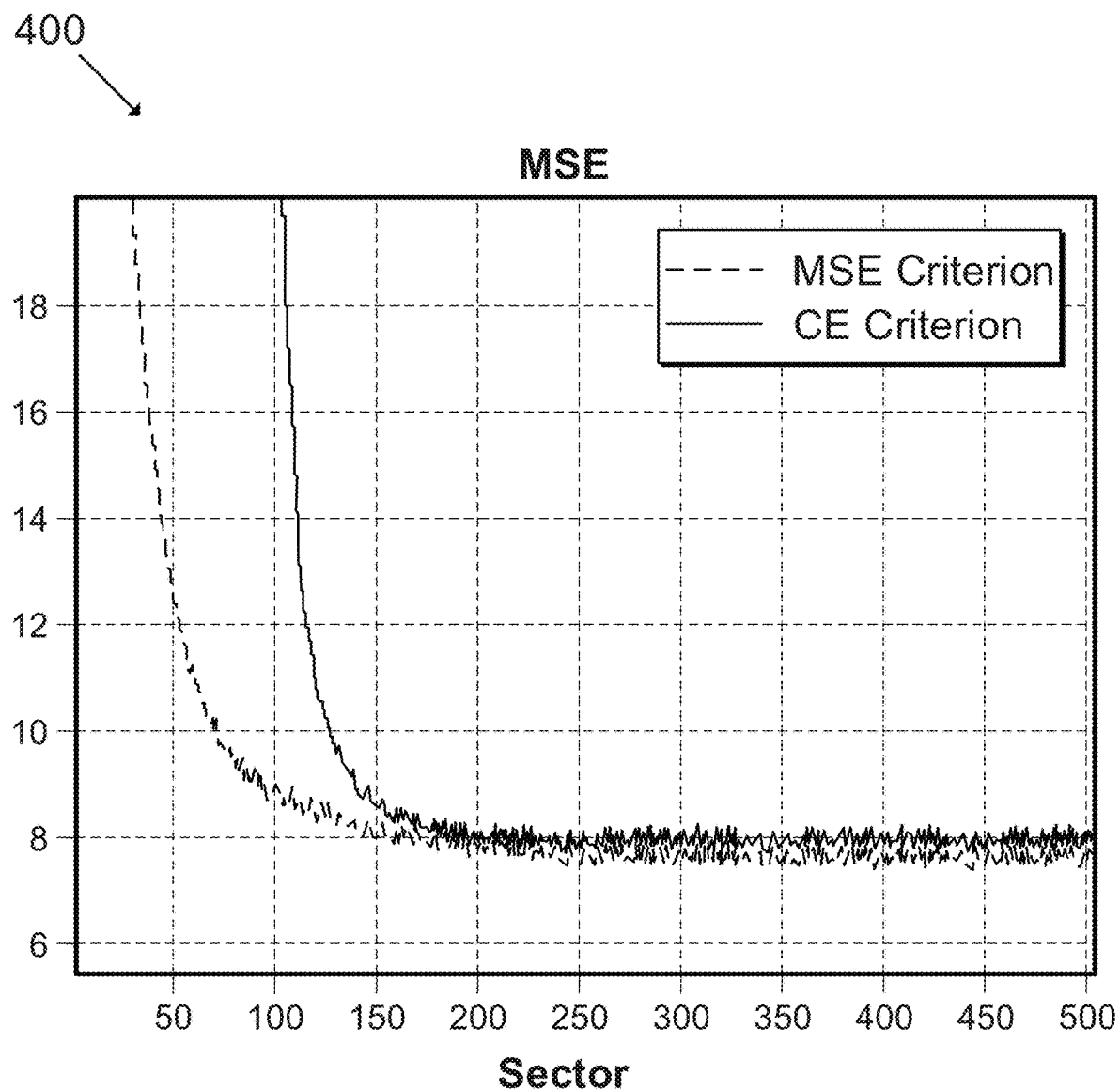
FIG. 4 is a graphical representation of how mean square error changes with each sector adaptation of a linear equalizer, in accordance with an embodiment of the present disclosure.

FIG. 4 is a graphical representation 400 of how mean squared error (MSE) changes with each sector adaptation of a linear version of equalizer 102, utilizing MMSE as a cost function versus utilizing cross-entropy as a cost function for adapting equalizer 102, in accordance with an embodiment of the present disclosure. MSE measures the average of the squares of the errors—that is, the average squared difference between the detected bit values and the actual bit values (e.g., as ascertained after any necessary error correction has been performed). As is apparent when viewing FIG. 2 alongside FIG. 4, although utilizing MMSE as the cost function for adapting equalizer 102 ultimately yields a lower MSE value than utilizing CE as the cost function yields (FIG. 4), utilizing CE as the cost function still yields a lower BER than utilizing MMSE as cost function yields (FIG. 2). So minimizing MSE is less correlated with minimizing BER than is minimizing CE. Therefore, MMSE is not as effective of a cost function as cross-entropy cost function is for use in adapting equalizer 102 to achieve a minimal BER.

Figure 5:
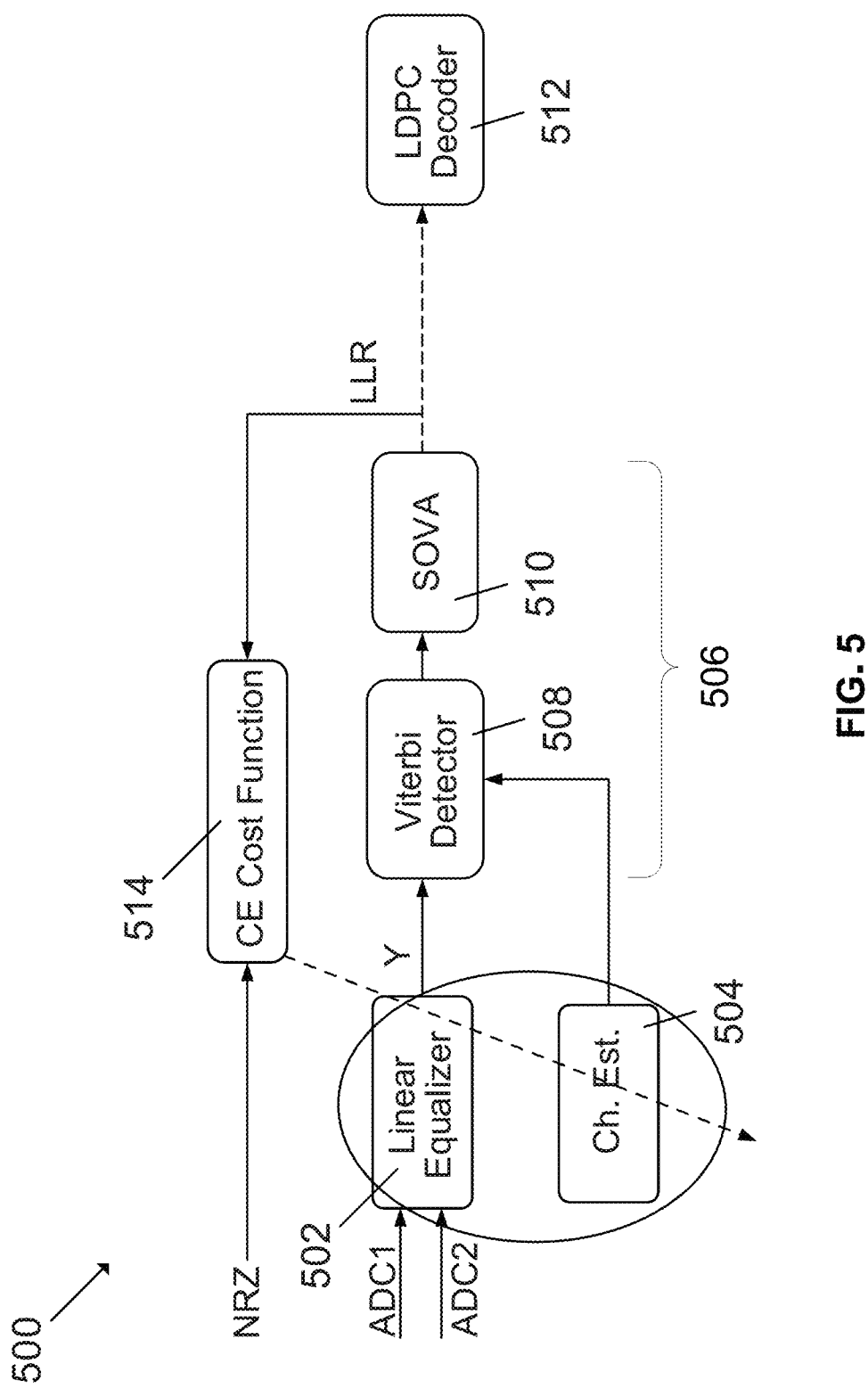
FIG. 5 is a schematic representation of a system for adaptation of a linear equalizer and a channel estimator of a TDMR channel, in accordance with an embodiment of the present disclosure.

FIG. 5 is a schematic representation of a system 500 for adaptation of a linear equalizer 502 and a channel estimator 504 of a TDMR channel, in accordance with an embodiment of the present disclosure. System 500 of FIG. 5 includes many components (e.g., equalizer 502, soft sequence detector for an ISI channel circuitry 506, Viterbi detector circuitry 508, SOVA circuitry 510, LDPC decoder circuitry 512) that are the same as or similar to those included in system 100 of FIG. 1 described above, and such similar components function in a manner similar to that described above. Accordingly, rather than repeating the descriptions of such similar components and their functionality, system 500 of FIG. 5 is described with an emphasis on the differences with respect to system 100 of FIG. 1. One difference between system 100 and system 500 is that system 500 includes a channel estimator 504 (sometimes referred to as a target), which is a filter that is configured to model channel characteristics (e.g., magnitude response, phase response, noise, and the like) of the TDMR channel and then to mitigate the signal distortion stemming from the channel characteristics.

In some TDMR read-back channels, in addition to adapting a linear equalizer by utilizing MMSE as a cost function, a channel estimator (sometimes also referred to as a target) is also adapted by utilizing MMSE as a cost function. Sometimes, an exhaustive brute force search method is utilized to search for the channel estimator parameters that yield a minimum BER for the TDMR channel. Executing such a search, however, is slow and computationally complex due to the large number of possible channel estimator parameters.

In system 500, in addition to adapting equalizer 504 by utilizing cross-entropy as a cost function, a channel estimator 504 (sometimes also referred to as a target) is also adapted by utilizing cross-entropy as a cost function. As will be shown below, the technique illustrated in FIG. 5 yields better BER than using MMSE adaptation criteria for adapting linear equalizer 502 and channel estimator 504.

Figure 6:
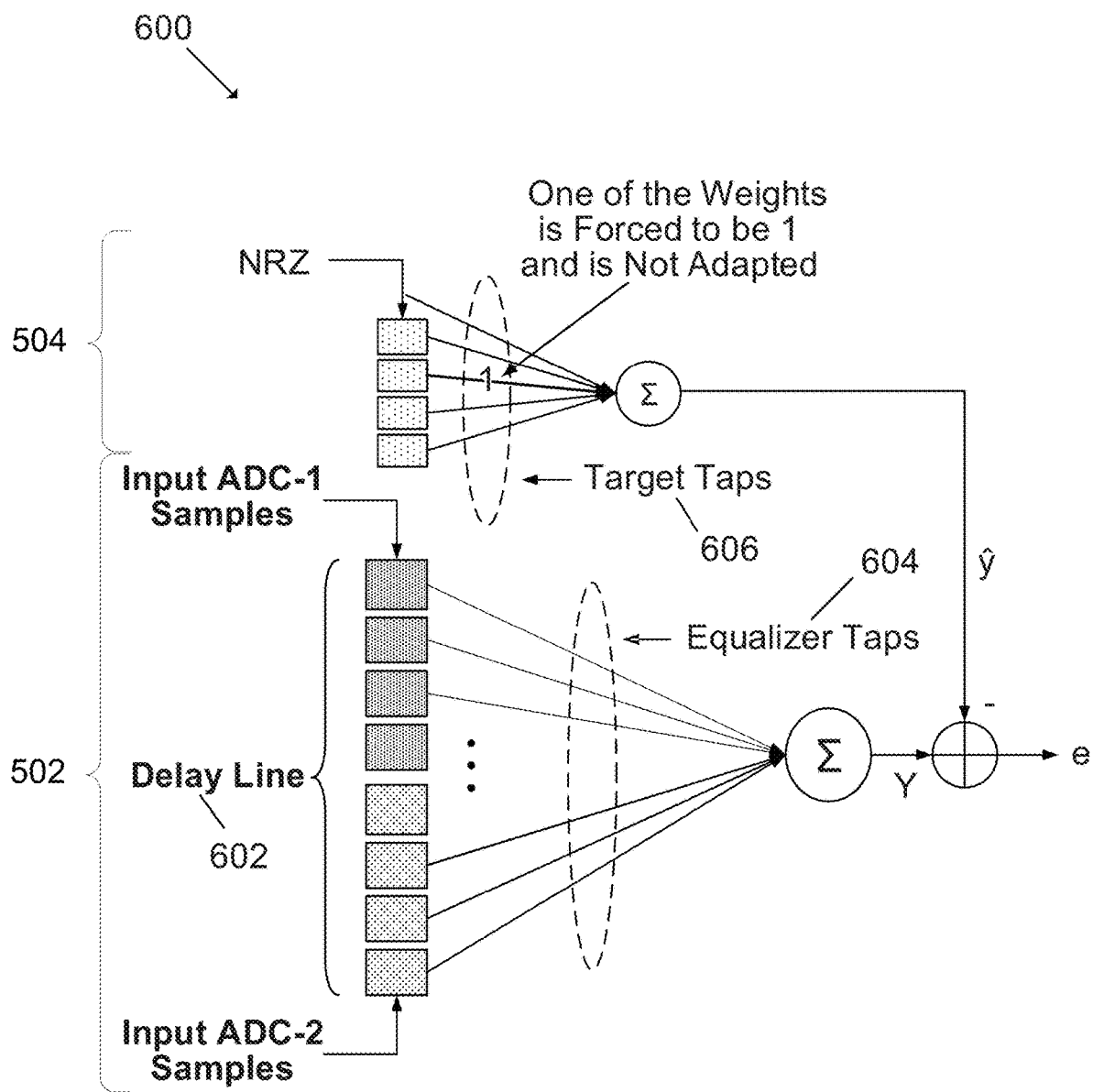
FIG. 6 is a schematic representation of the linear equalizer and channel estimator of FIG. 5, in accordance with an embodiment of the present disclosure.

FIG. 6 is a schematic representation 600 of the linear equalizer 502 and channel estimator 504 of FIG. 5, in accordance with an embodiment of the present disclosure. Linear equalizer 502 includes a delay line 602 which stores delayed read-back input signal (ADC1, ADC2) samples, which are then linearly combined using equalizer taps 604. The digital NRZ values are combined using target taps 606. When MSE criteria is used to adapt equalizer 502 and channel estimator 504, then the mean of squared error ($e^2$) is minimized. In order to prevent target taps 606 from being adapted to all zero, the coefficient of one of the target taps is fixed to a constant value (e.g., a value of 1) and is not adapted.

The gradient between cross-entropy computed at cross-entropy cost function circuitry 514 and filter taps of equalizer 502 can be computed by applying the chain rule in a manner similar to that described above in connection with system 100 of FIG. 1. In order to also adapt the filter tap coefficients of channel estimator 504 (also referred to as target taps), however, the chain rule is applied as indicated below.

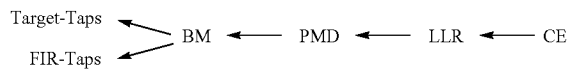

$$\frac{\partial(CE)}{\partial(\text{Target Taps})} = \frac{\partial(BM)}{\partial(\text{Target Taps})} \frac{\partial(PMD)}{\partial(BM)} \frac{\partial(LLR)}{\partial(PMD)} \frac{\partial(CE)}{\partial(LLR)}$$

$$\frac{\partial(CE)}{\partial(2D\ FIR\ \text{Taps})} = \frac{\partial(BM)}{\partial(2D\ FIR\ \text{Taps})} \frac{\partial(PMD)}{\partial(BM)} \frac{\partial(LLR)}{\partial(PMD)} \frac{\partial(CE)}{\partial(LLR)}$$

Figure 7:
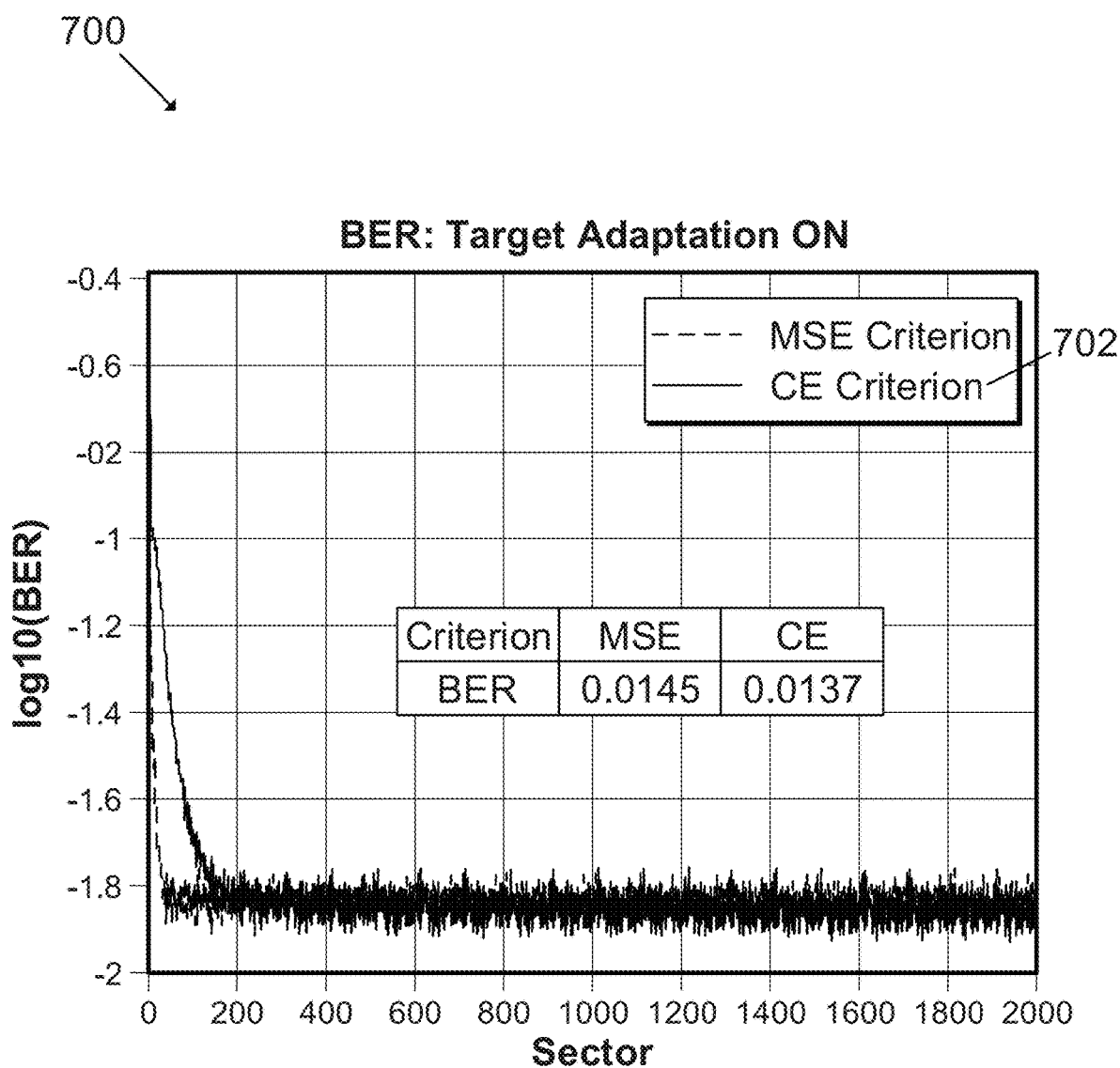
FIG. 7 is a graphical representation of how bit error rate changes over each sector adaptation of both the linear equalizer and the channel estimator utilizing two different cost functions, in accordance with an embodiment of the present disclosure.

FIG. 7 is a graphical representation 700 of how BER changes over each sector adaptation of both linear equalizer 502 and channel estimator 504 by utilizing two different cost functions (the MSE cost function and the CE cost function), in accordance with an embodiment of the present disclosure. In particular, FIG. 2 was generated based on simulations that were run to test the cross-entropy-based equalizer and channel estimator adaptation scheme described above in connection with FIG. 5 to determine how it performs and how much improvement it provides in BER over prior techniques. The simulations were executed with the following TDMR settings.

| TDMR Simulation Settings for FIG. 5 |
| --- |
| 2-reader TDMR system |
| Cross-track separation between two readers: 30% |
| 100 sector ADC samples captured for off-track position of 0%, with each sector being 39512 bits long |
| 100 sectors are cycled through repetitively |
| Adaptation batch size: 1024 |
| Off-track: 0% |
| Viterbi path memory length: 30 |
| SOVA trace back length: 20; SOVA traceback depth: 3 |
| Viterbi has 16 states |
| Adaptation criteria: cross-entropy vs. mean square error |

As illustrated by comparing FIG. 7 and FIG. 2, adapting both equalizer 502 and channel estimator 504 yields lower BERs (0.0145 BER for MSE, 0.0137 BER for CE), regardless of whether MSE or CE is utilized as the cost function, than the BERs (0.0179 BER for MSE, 0.0159 BER for CE) that are achieved by utilizing either MMSE or cross-entropy as the cost function to adapt equalizer 102 only without also adapting channel estimator 504. Therefore, adapting channel estimator 504 further improves BER performance over prior techniques. FIG. 7 also shows that utilizing cross-entropy as the cost function to adapt both equalizer 502 and channel estimator 504 yields a lower BER than utilizing MSE as the cost function to adapt both equalizer 502 and channel estimator 504.

Figure 8:
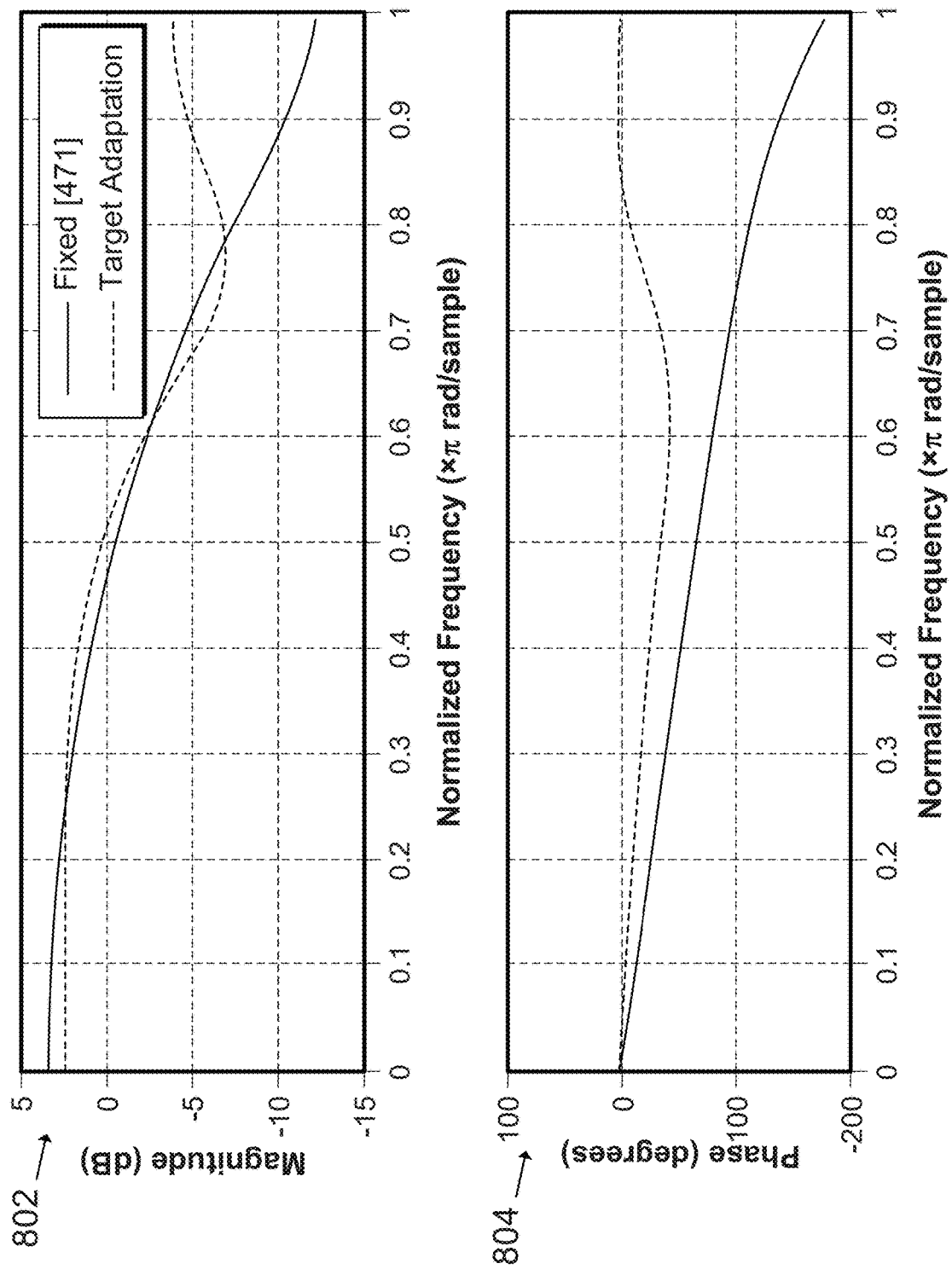
FIG. 8 is a graphical representation of the magnitude and phase responses of the channel estimator when the channel estimator is adapted and when the channel remains fixed, in accordance with an embodiment of the present disclosure.

FIG. 8 is a graphical representation 800 of the magnitude responses 802 and phase responses 804 of channel estimator 504 when channel estimator 504 is adapted based on the cross-entropy cost function and when channel estimator 504 remains un-adapted, or fixed, in accordance with an embodiment of the present disclosure. When channel estimator 504 is adapted, at high frequencies its magnitude response is higher than the magnitude response for the fixed channel estimator 504. Thus, the adapted channel estimator 504 technique yields a flatter overall magnitude response across the band than the fixed channel estimator does, thereby improving the effectiveness of channel estimator 504 at mitigating the negative effects of channel characteristics upon signal integrity and read-back accuracy and performance.

Figure 9:
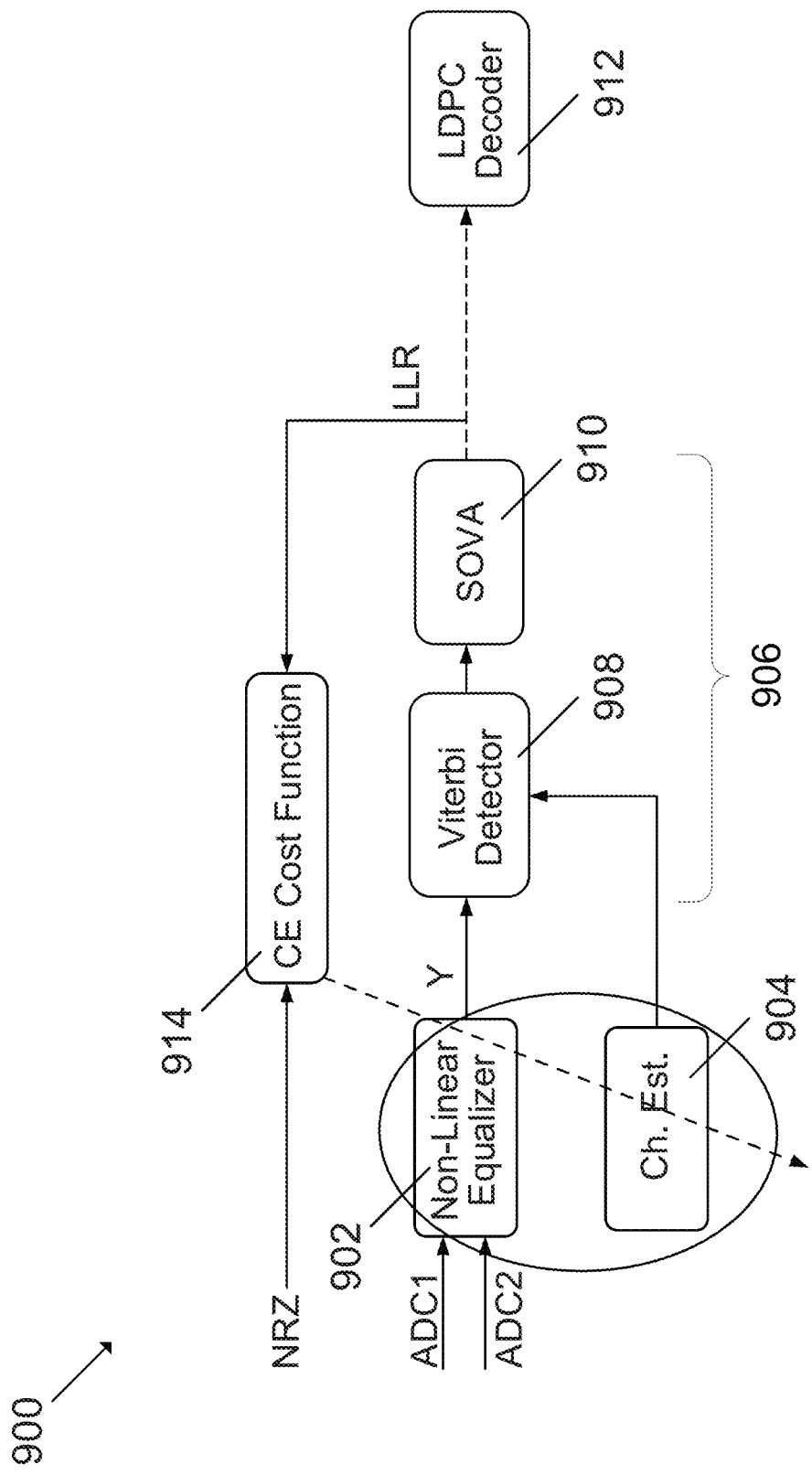
FIG. 9 is a schematic representation of a system for adaptation of a non-linear equalizer and a channel estimator of a TDMR channel, in accordance with an embodiment of the present disclosure.

FIG. 9 is a schematic representation of a system 900 for adaptation of non-linear equalizer 902 and channel estimator 904 of a TDMR channel, in accordance with an embodiment of the present disclosure. System 900 of FIG. 9 includes many components (e.g., channel estimator 904, soft sequence detector for an ISI channel circuitry 906, Viterbi detector circuitry 908, SOVA circuitry 910, LDPC decoder circuitry 912) that are the same as or similar to those components included in system 100 (FIG. 1) and/or system 500 (FIG. 5) described above, and such similar components function in manners similar to those described above. Accordingly, rather than repeating the descriptions of such similar components and their functionality, system 900 of FIG. 9 is described with an emphasis on the differences with respect to systems 100, 500. One such difference is that system 900 includes non-linear equalizer 902. The TDMR channel in some cases may exhibit many nonlinear characteristics, and the read-back signal obtained from the storage media may be impacted by many non-linear types of noise. Non-linear equalizer 902 provides superior equalization than linear equalizer 502, particularly when faced with non-linear noise from non-linear noise sources, such as noise stemming from particular digital data values stored on the storage medium.

In system 900, both non-linear equalizer 902 and channel estimator 904 (sometimes also referred to as a target) are adapted by utilizing cross-entropy as a cost function. As will be shown below, the technique illustrated in FIG. 9 yields better BER than using MMSE adaptation criteria for adapting linear equalizer 502 and channel estimator 504.

Figure 10:
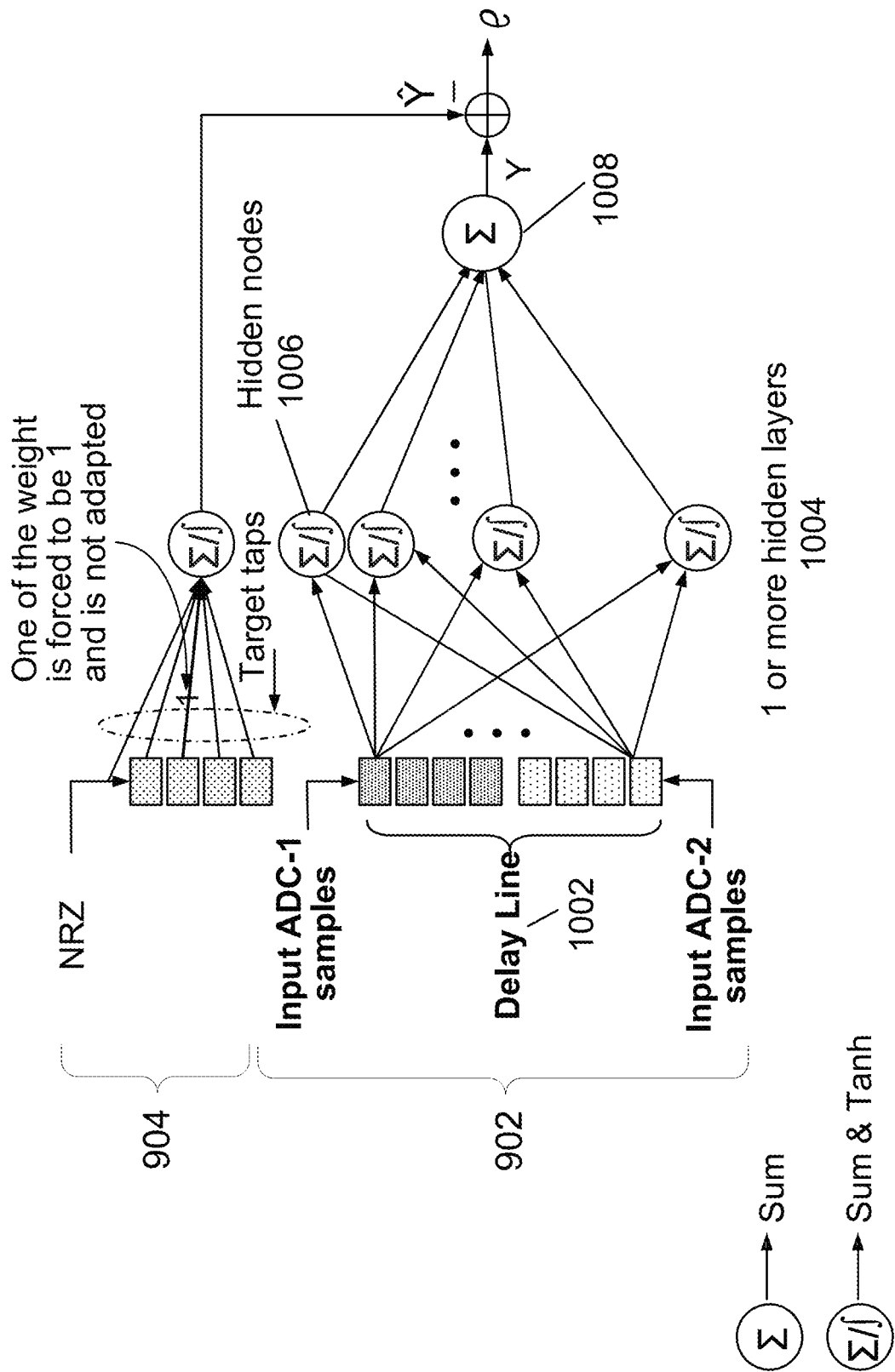
FIG. 10 is a graphical representation of the non-linear equalizer and channel estimator of FIG. 9, in accordance with an embodiment of the present disclosure.

FIG. 10 is a graphical representation of non-linear equalizer 902 and channel estimator 904 of FIG. 9, in accordance with an embodiment of the present disclosure. Similar to linear equalizer 502 described above, two read-back input signal streams (ADC-1, ADC-2) are sent to first-in-first out (FIFO) delay line 1002. But non-linear equalizer 902 has more layers of nodes than linear equalizer 502. FIG. 10 shows one hidden layer 1004 with four hidden nodes 1006. Each hidden node 1006 sums delayed ADC samples multiplied by parameters (filter tap coefficients). Each hidden node 1006 applies to its computed sum passed a non-linear activation function (e.g., a hyperbolic tangent activation function, tanh or other functions), to generate a node output, which is then passed to the next layer, and so on. The final layer 1008 does not have non-linear activation function but simply sums the inputs. One approach for adapting the parameters of non-linear equalizer 902 is to compute the error (e) with respect to the ideal FIR sample ($\hat{Y}$) as shown in FIG. 10, and then minimize its mean square error using MSE as the cost function. As described below, however, cross-entropy serves as a more effective cost function than MSE for adapting the parameters of non-linear equalizer 902 to minimize BER.

Figure 11:
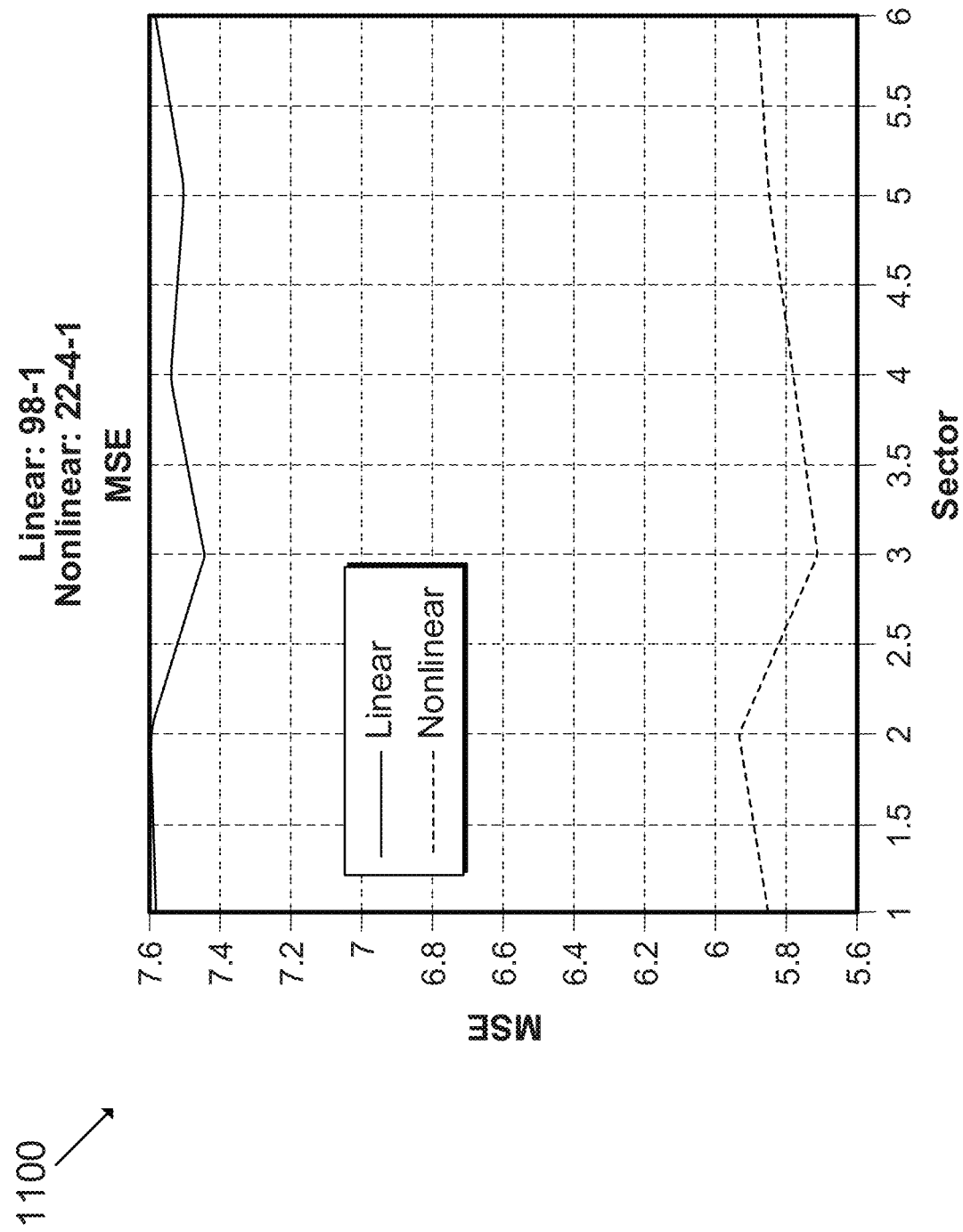
FIG. 11 is a graphical representation of a comparison of mean square error performances of a linear equalizer and a non-linear equalizer, in accordance with an embodiment of the present disclosure.

FIG. 11 is a graphical representation 1100 of a comparison of mean square error performances of a linear equalizer (with 99 parameters consisting of 98 input nodes and 1 output node) and a non-linear equalizer (97 parameters consisting of 22 input nodes, 4 hidden nodes, and 1 output node), adapted using MSE as the adaptation criterion, in accordance with an embodiment of the present disclosure. For the six sectors shown, the MSE for the non-linear equalizer is substantially smaller than the MSE for the linear equalizer. Thus the non-linear equalizer, when adapted using the MSE criterion, can achieve a lower MSE than the linear equalizer.

Figure 12:
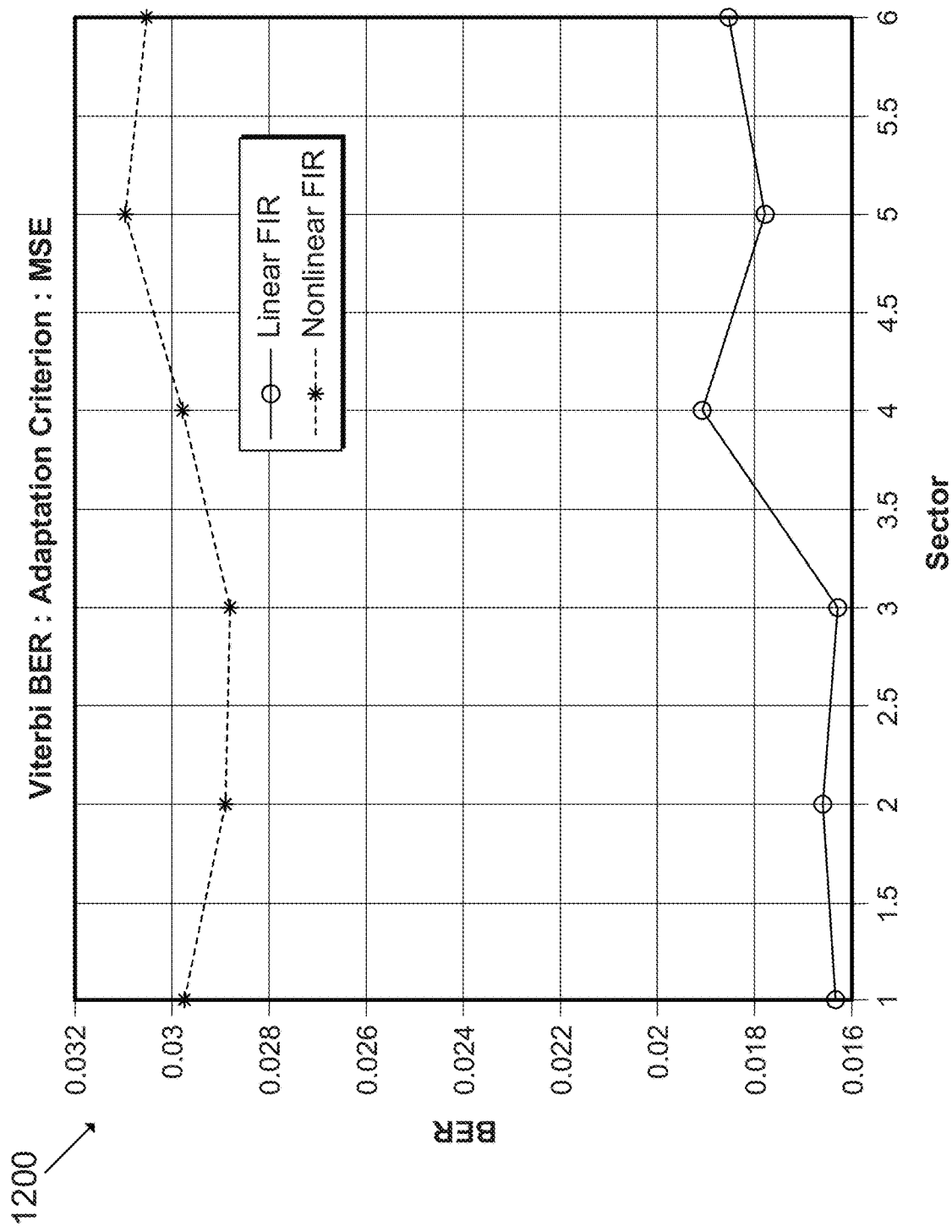
FIG. 12 is a graphical representation of bit error rate performance for six sectors with a linear equalizer and a non-linear equalizer, in accordance with an embodiment of the present disclosure.
Figure 13:
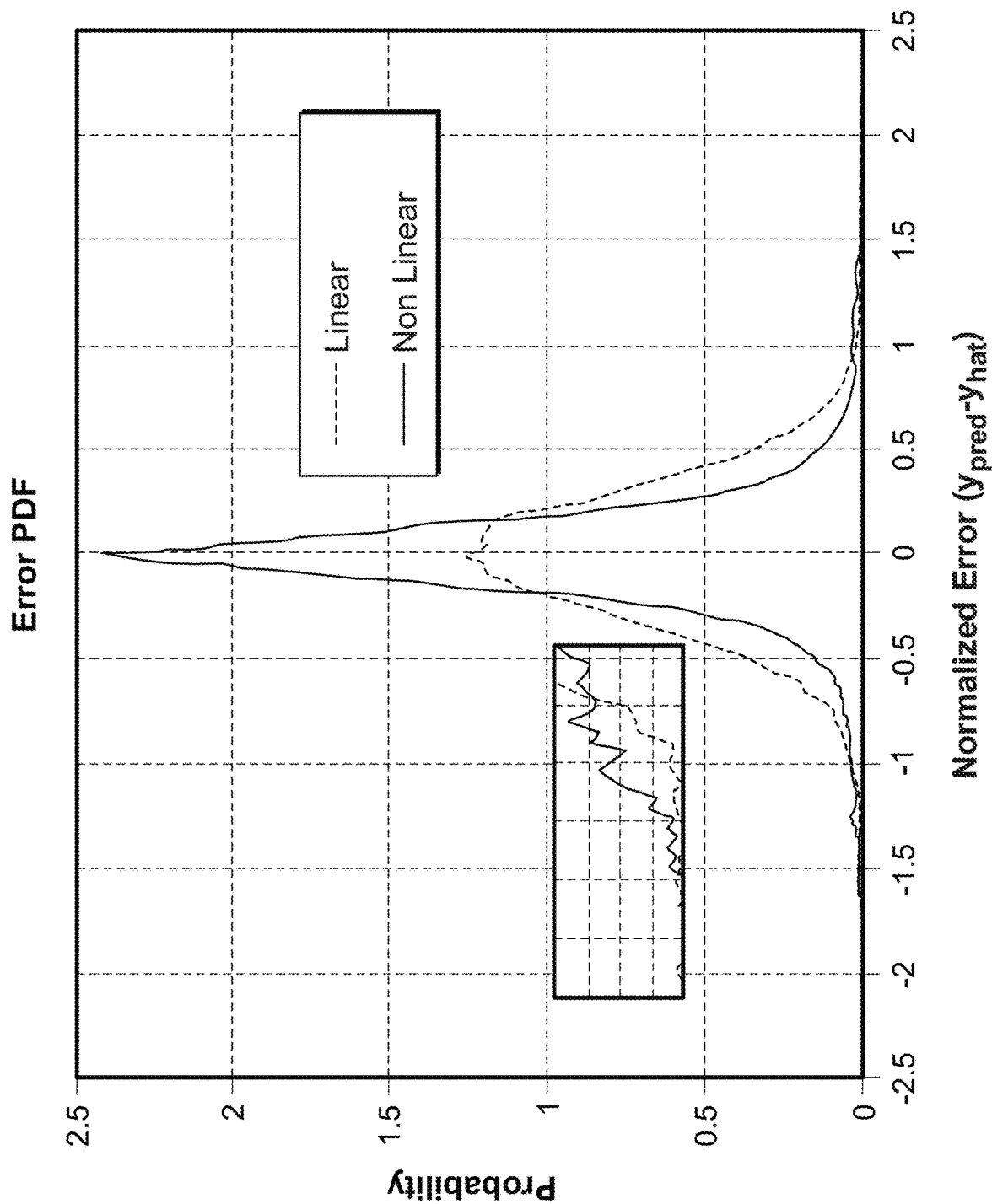
FIG. 13 is a graphical representation of probability density functions of errors at the outputs of the linear equalizer and the non-linear equalizer, in accordance with an embodiment of the present disclosure.

FIG. 12 is a graphical representation 1200 of bit error rate performance for six sectors with a linear equalizer and a non-linear equalizer, in accordance with an embodiment of the present disclosure. As FIG. 12 illustrates, the non-linear equalizer has a higher BER than the linear equalizer has. FIG. 13 is a graphical representation 1300 of probability density functions (PDFs) of errors at the outputs of the linear equalizer and the non-linear equalizer, in accordance with an embodiment of the present disclosure. As FIG. 13 shows, the non-linear equalizer has lot more error samples close to zero, indicating a smaller MSE but a longer tail of the PDF is giving a higher BER for the non-linear equalizer. Therefore, even though the non-linear equalizer can achieve a lower MSE, it does not yield a lower BER when adapted with the MSE criterion.

In order to generate the cost function to be utilized to adapt the non-linear equalizer 902 and channel estimator 904, the gradient between cross-entropy computed at cross-entropy cost function circuitry 914 and filter taps of equalizer 902, as well as the gradient between cross-entropy computed at cost function circuitry 914 and filter taps of channel estimator 904, can be computed by applying the chain rule in a manner similar to that described above in connection with system 500 of FIG. 5, as represented below.

$$\frac{\partial (CE)}{\partial (\text{Target Taps})} = \frac{\partial (BM)}{\partial (\text{Target Taps})} \frac{\partial (PMD)}{\partial (BM)} \frac{\partial (LLR)}{\partial (PMD)} \frac{\partial (CE)}{\partial (LLR)}$$

$$\frac{\partial (CE)}{\partial (2D\ NLFIR\ \text{Taps})} = \frac{\partial (BM)}{\partial (2D\ NLFIR\ \text{Taps})} \frac{\partial (PMD)}{\partial (BM)} \frac{\partial (LLR)}{\partial (PMD)} \frac{\partial (CE)}{\partial (LLR)}$$

Figure 14:
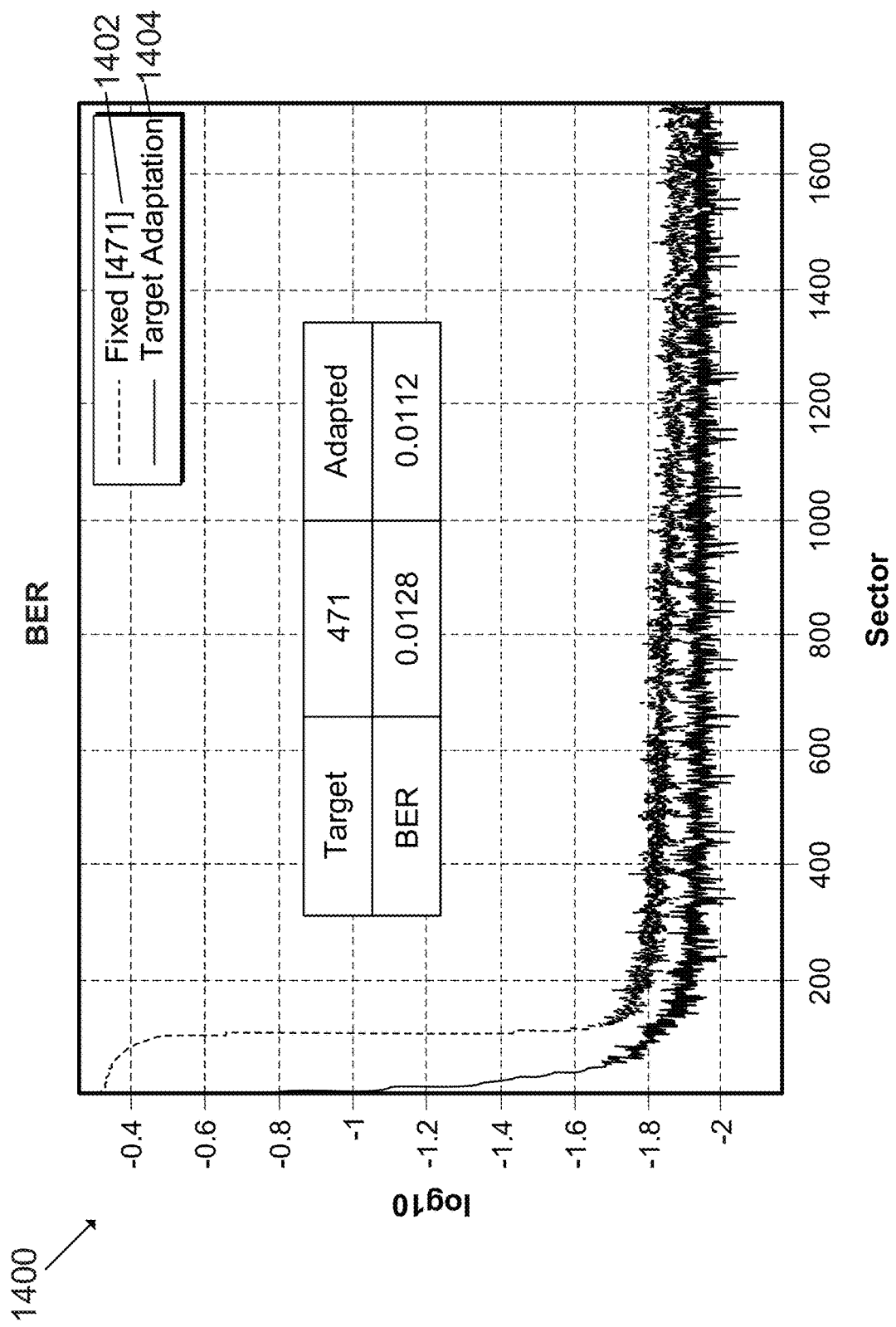
FIG. 14 is a graphical representation of bit error rate performances of the non-linear equalizer with a fixed channel estimator and with a channel estimator adapted based on a cross-entropy cost function, in accordance with an embodiment of the present disclosure.

FIG. 14 is a graphical representation 1400 of bit error rate performances of a non-linear equalizer with a fixed channel estimator and with a channel estimator adapted based on a cross-entropy cost function, in accordance with an embodiment of the present disclosure. In particular, FIG. 14 was generated based on simulations were run to test the cross-entropy-based equalizer and channel estimator adaptation scheme described above in connection with FIG. 9 to determine how it performs and how much improvement it provides in BER over prior techniques. The simulations were executed with the following TDMR settings.

| TDMR Simulation Settings for FIG. 9 |
|---|
| 2-reader TDMR system |
| Cross-track separation between two readers: 30% |
| 100 sector ADC samples captured for off-track position of 0%, with each sector being 39512 bits long |
| 100 sectors are cycled through repetitively |
| Adaptation batch size: 1024 |
| Off-track: 0% |
| Viterbi path memory length: 30 |
| SOVA trace back length: 20; SOVA traceback depth: 3 |
| Viterbi has 16 states |
| Adaptation criteria: cross-entropy |

In FIG. 14, curve 1402 shows the performance of a TDMR channel having the non-linear equalizer adapted by utilizing cross-entropy as a cost function, and having the channel estimator (not separately shown in FIG. 14) fixed with 4 as a first tap, 7 as a second tap, and 1 as a third tap. So estimator target coefficients are fixed to [4,7,1]. Curve 1404 shows the performance of a TDMR channel having the non-linear equalizer and channel estimators both being adapted utilizing CE criterion for adaptation. The BER of curve 1404 (0.0112) is lower than the BER of curve 1402 (0.0137). Thus, adapting the channel estimator yields an improved BER performance over the fixed channel estimator. The BER of curve 1404 in FIG. 14 is also lower than the BER of curve 702 in FIG. 7. Thus, the non-linear equalizer BER is lower than the linear equalizer BER when CE is used as adaptation criterion.

Figure 15:
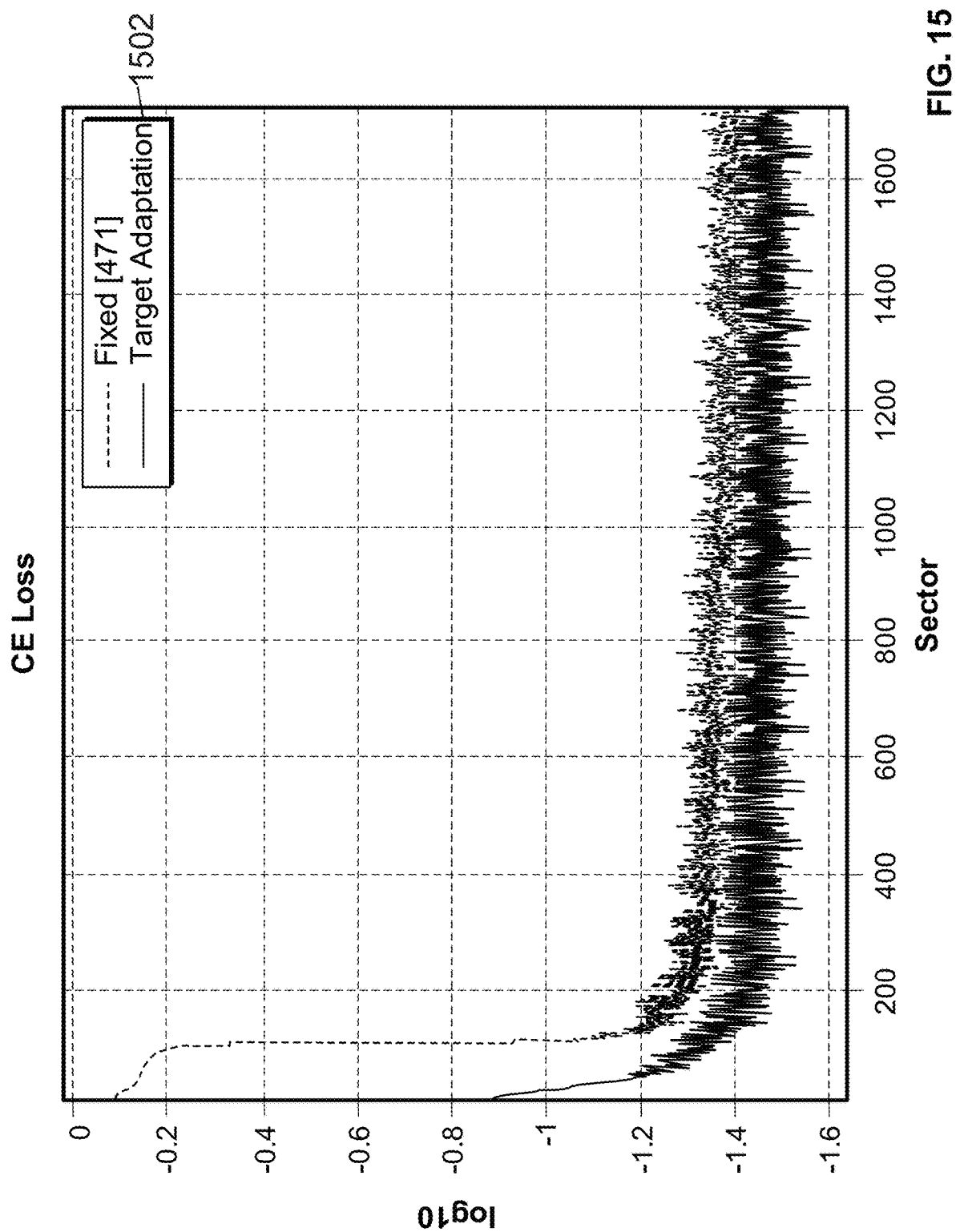
FIG. 15 is a graphical representation comparing cross-entropy loss for a fixed channel estimator with cross-entropy loss for a channel estimator adapted based on a cross-entropy cost function, in accordance with an embodiment of the present disclosure.
Figure 16:
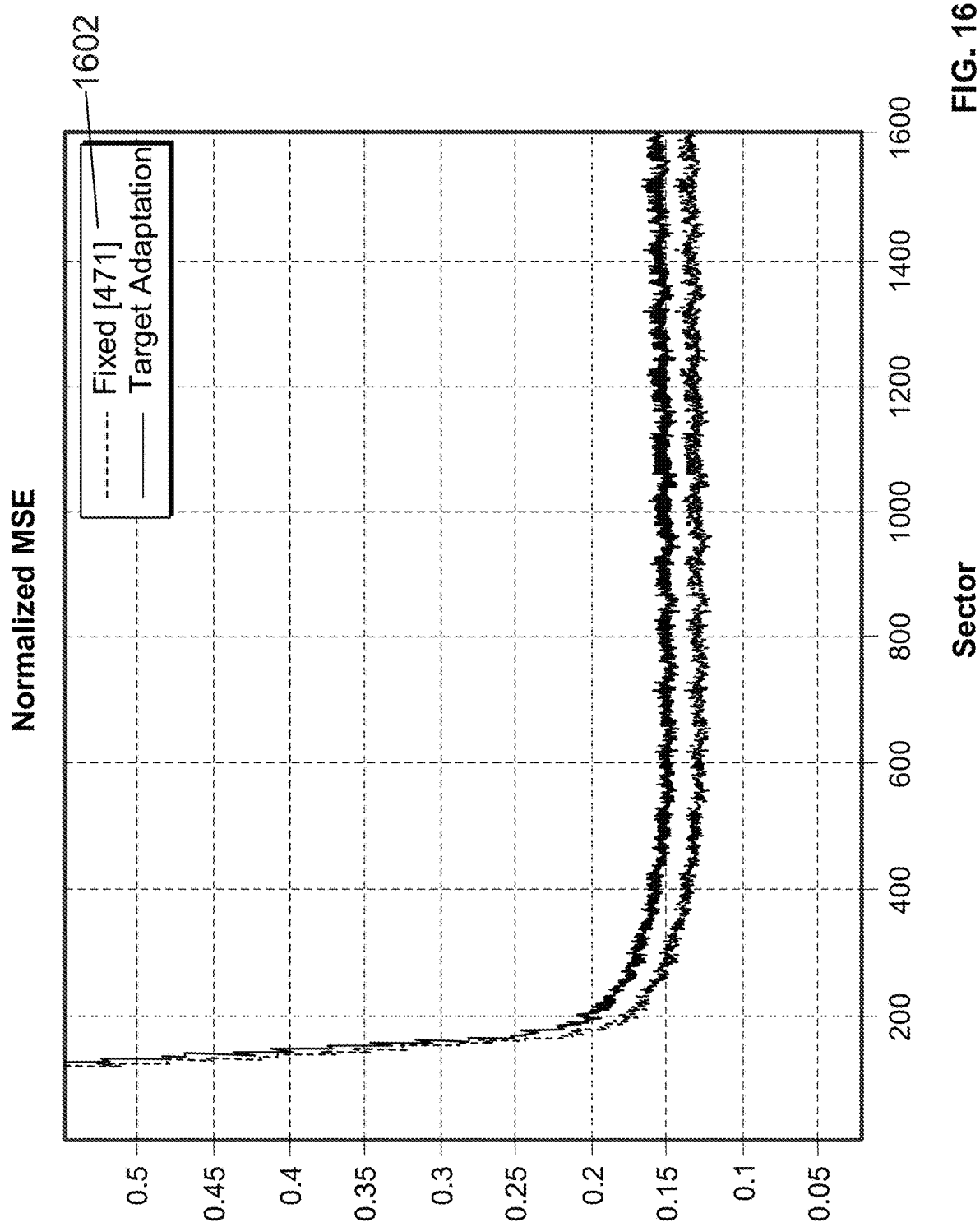
FIG. 16 is a graphical representation comparing normalized mean square error for a fixed channel estimator with normalized mean square error for a channel estimator adapted based on a cross-entropy cost function, in accordance with an embodiment of the present disclosure.

FIG. 15 shows how cross entropy changes with adaptation and FIG. 16 shows how MSE changes with adaptation. Even though curve 1602 in FIG. 16 has a lower MSE, curve 1402 in FIG. 14 does not have a lower BER. Curve 1502 in FIG. 15 has a lower CE which matches with the lower BER of curve 1404 in FIG. 14. So minimizing MSE does not necessarily yield a minimized BER. On the other hand, minimizing CE does yield a minimized BER. CE is thus the better cost function than MSE for adapting the equalizer and channel estimator.

Figure 17:
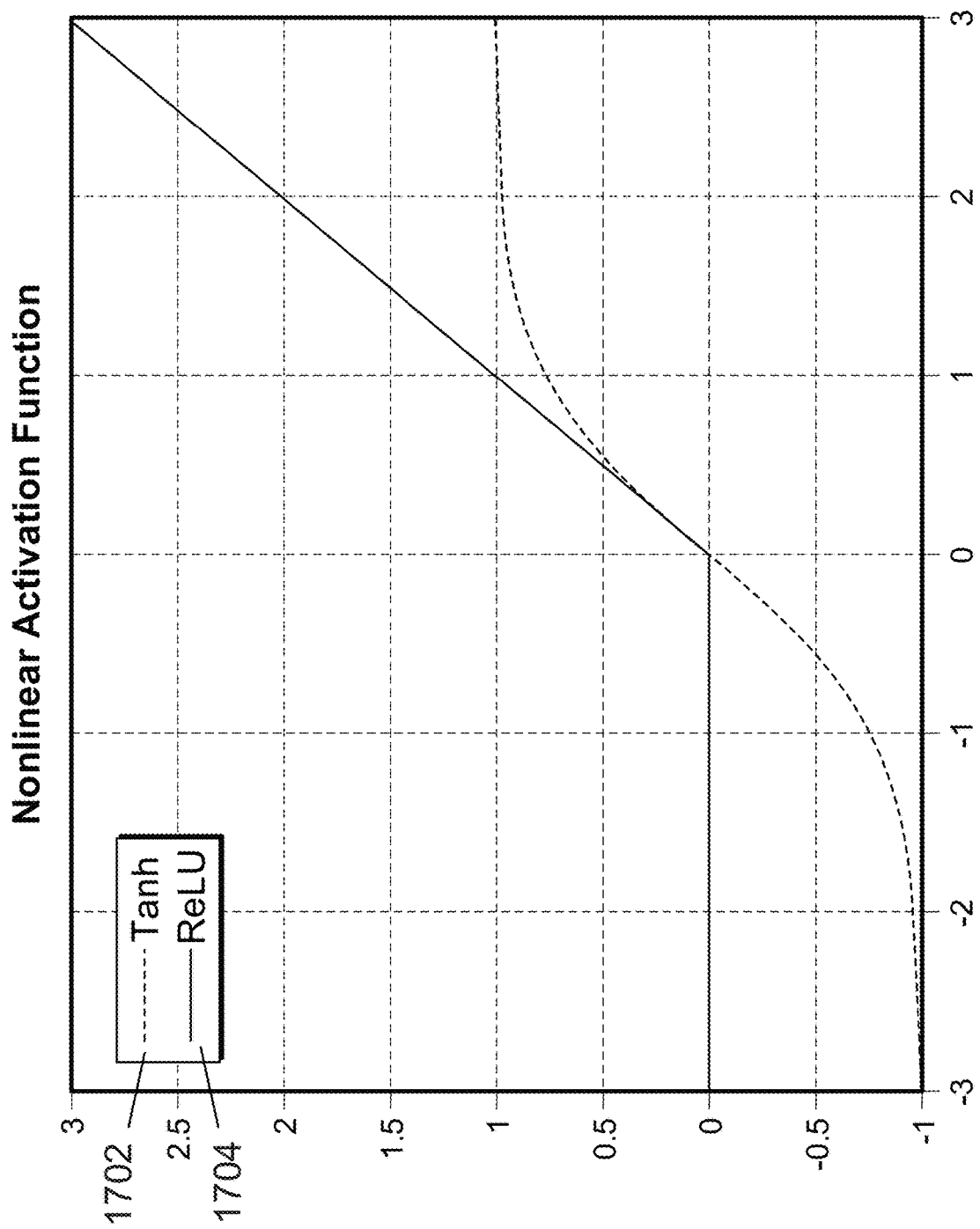
FIG. 17 is a graphical representation of two types of non-linear activation functions that may be implemented at hidden neural network nodes of the non-linear equalizer, in accordance with an embodiment of the present disclosure.
Figure 18:
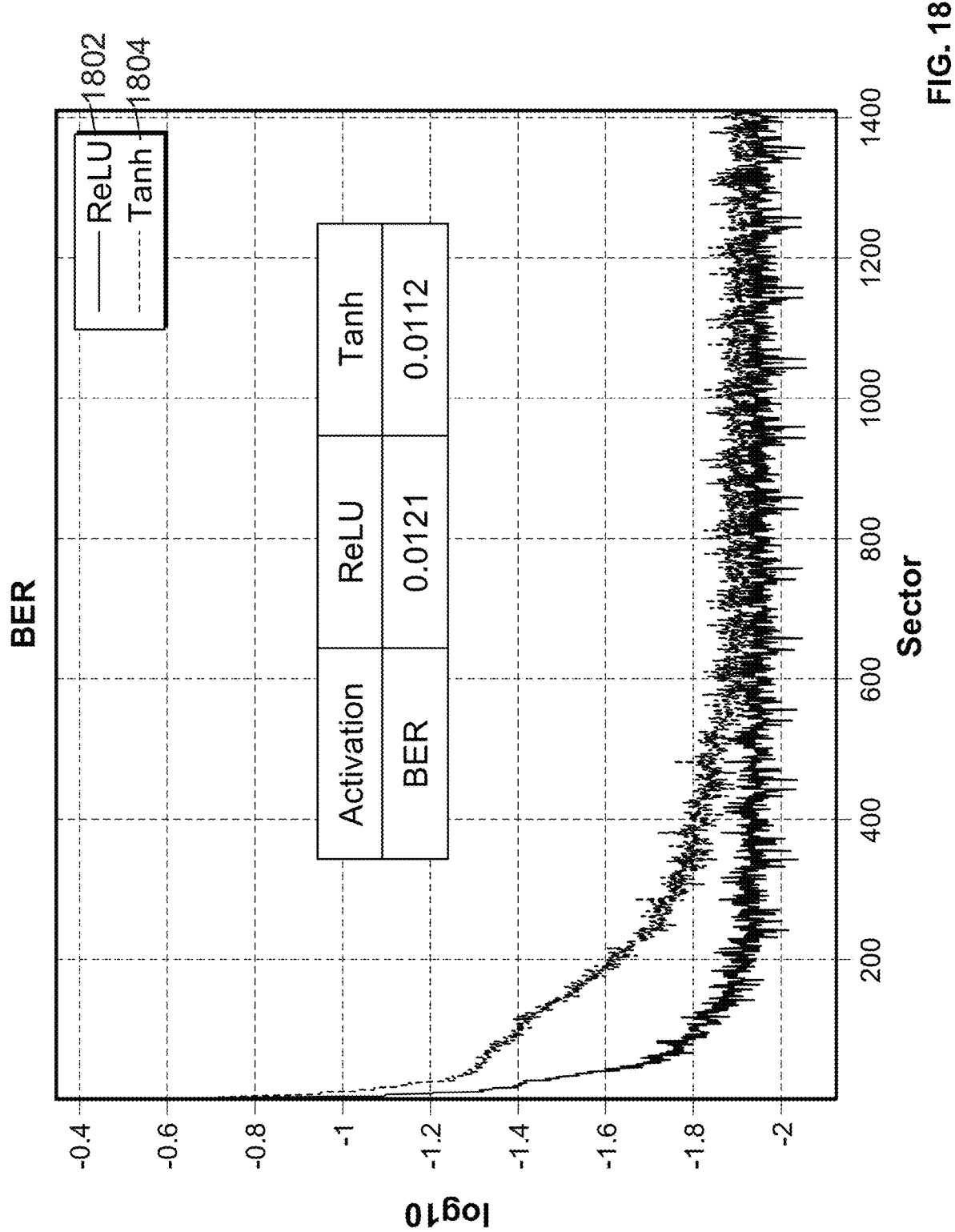
FIG. 18 is graphical representation comparing the respective bit error rate performances of the non-linear equalizer implementing the two different activation functions depicted in FIG. 17, in accordance with an embodiment of the present disclosure.

Having demonstrated that the non-linear equalizer yields a better BER than the linear equalizer, particularly in the face of non-linear types of noise, reference is now made to some parameters of the non-linear equalizer that may be adjusted to further optimize its performance. One such parameter is the non-linear activation function, which is executed at each hidden node 1006 of the non-linear equalizer 902. FIG. 17 shows two different activation functions, a hyperbolic tangent activation function (Tanh) 1702 and a rectified linear unit activation function (ReLU) 1704. FIG. 18 shows the BER performances 1802, 1804 of non-linear equalizer 902 with the ReLU and Tanh activation functions, respectively. The Tanh activation function has a lower BER (0.0112) than the BER (0.0121) of the ReLU and is therefore a better activation function to use in the non-linear equalizer.

Figure 19:
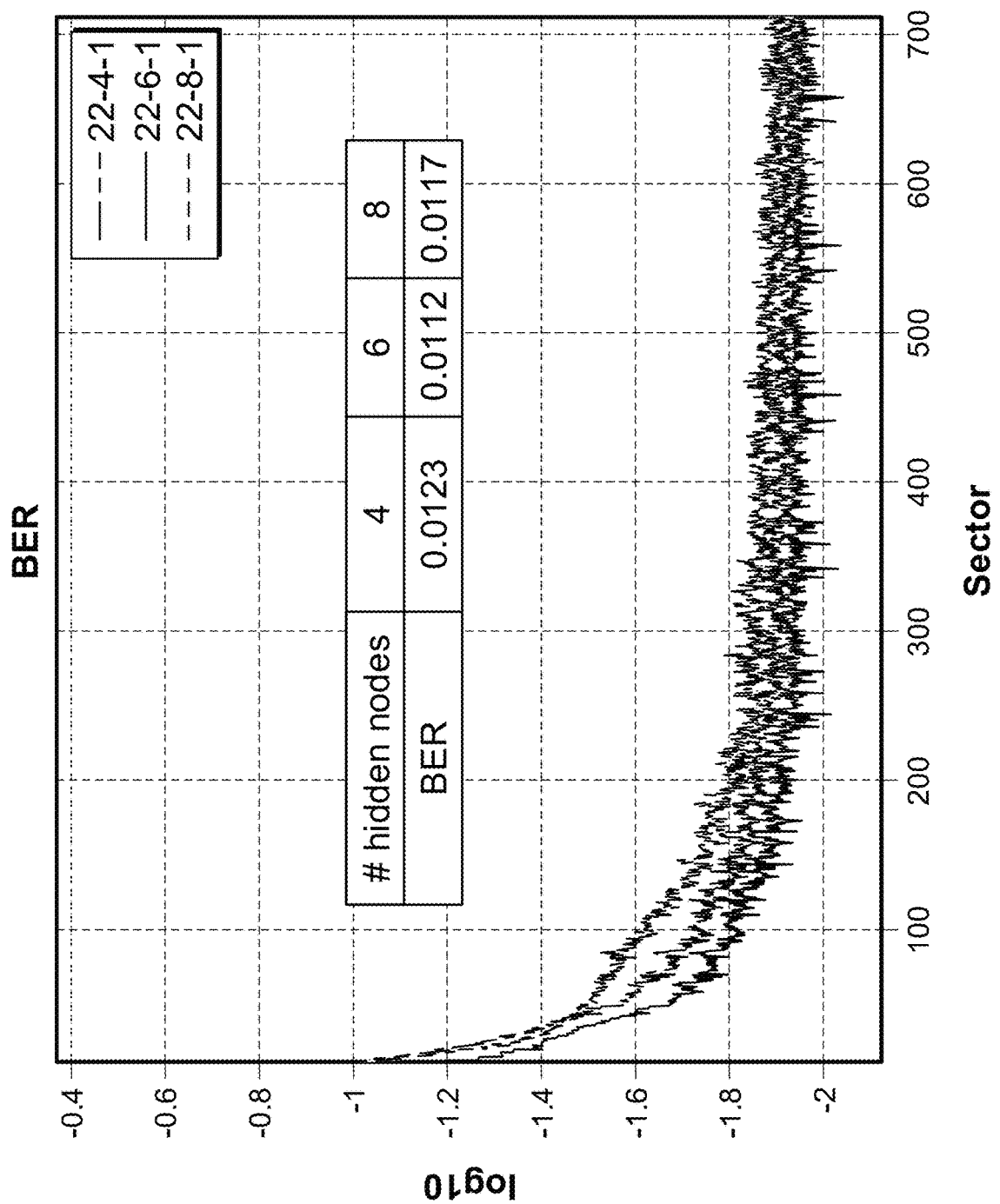
FIG. 19 is a graphical representation of respective bit error rate performances of the non-linear equalizer in three examples where the non-linear equalizer is configured to have three different numbers of hidden nodes, in accordance with an embodiment of the present disclosure.

Next, we test three configurations of the non-linear equalizer, each having a different number of hidden nodes 1006 (four, six, and eight, respectively) but each having a single hidden layer 1004. FIG. 19 shows the BER performances of each of the three non-linear equalizer configurations (22-4-1, 22-6-1, 22-8-1). The configuration having six hidden nodes yields the lowest BER (0.0112), and is therefore a better number of hidden nodes to use in the non-linear equalizer than four or eight hidden nodes. This number can be optimized for each particular magnetic recording system.

Figure 20:
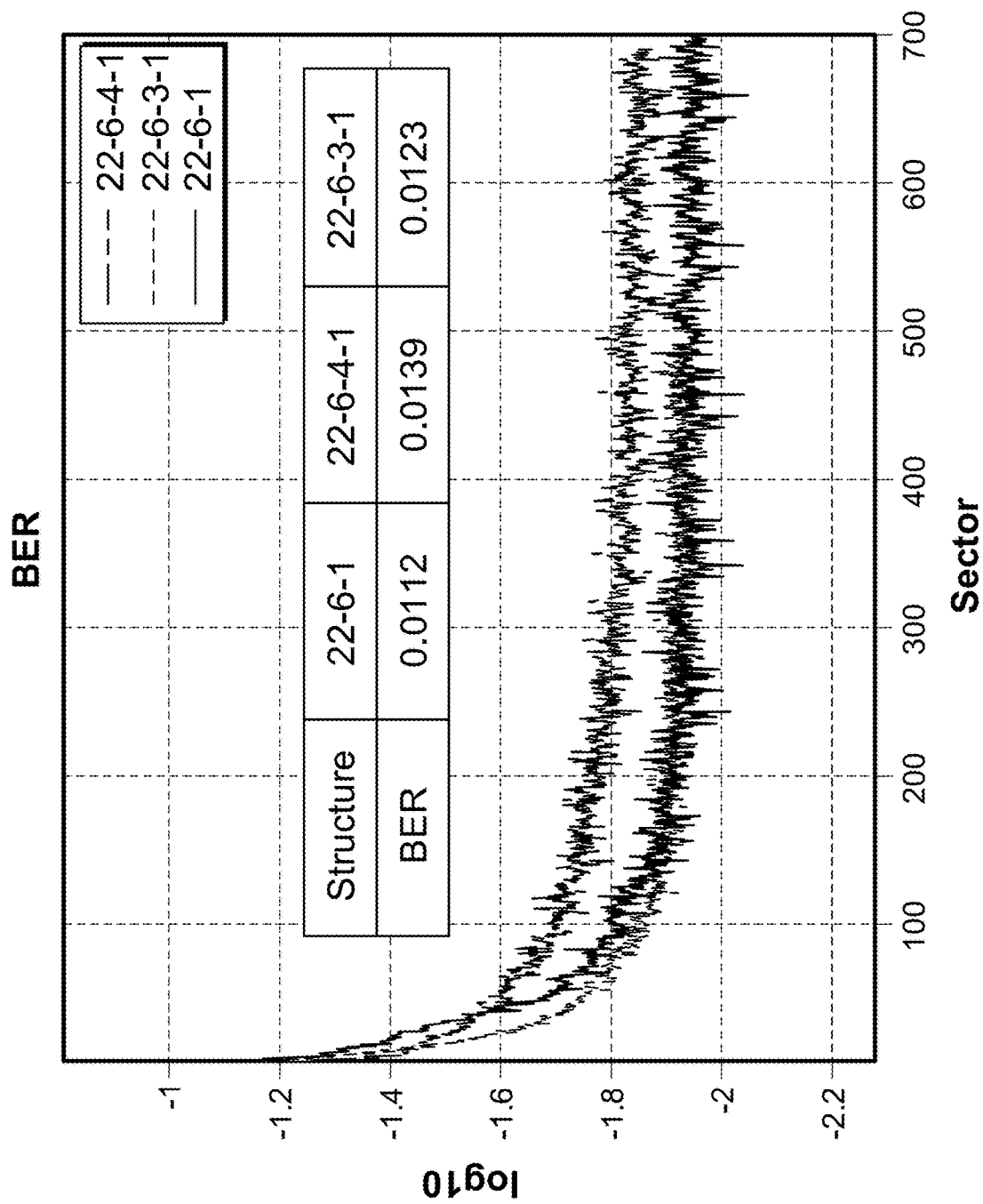
FIG. 20 is a graphical representation of respective bit error rate performances of the non-linear equalizer in three examples where the non-linear equalizer is configured to have different numbers of hidden nodes and hidden layers, in accordance with an embodiment of the present disclosure.

Next, we test three different configurations of the non-linear equalizer, each having particular numbers of hidden layers 1004 and hidden nodes 1006. In particular, we test a first non-linear equalizer configuration (22-6-1) which has one hidden layer with six hidden nodes. A second non-linear equalizer configuration (22-6-4-1) has two hidden layers—one with six hidden nodes and another with 4 hidden nodes. A third non-linear equalizer configuration (22-6-3-1) has two hidden layers—one with six hidden nodes and another with three hidden nodes. FIG. 20 shows the BER performance of the three non-linear equalizer configurations. The 22-6-1 structure yields the lowest BER (0.0112) and is therefore better structure to use in the non-linear equalizer than the other structures. This structure can be optimized for each given magnetic recording system.

Figure 21:
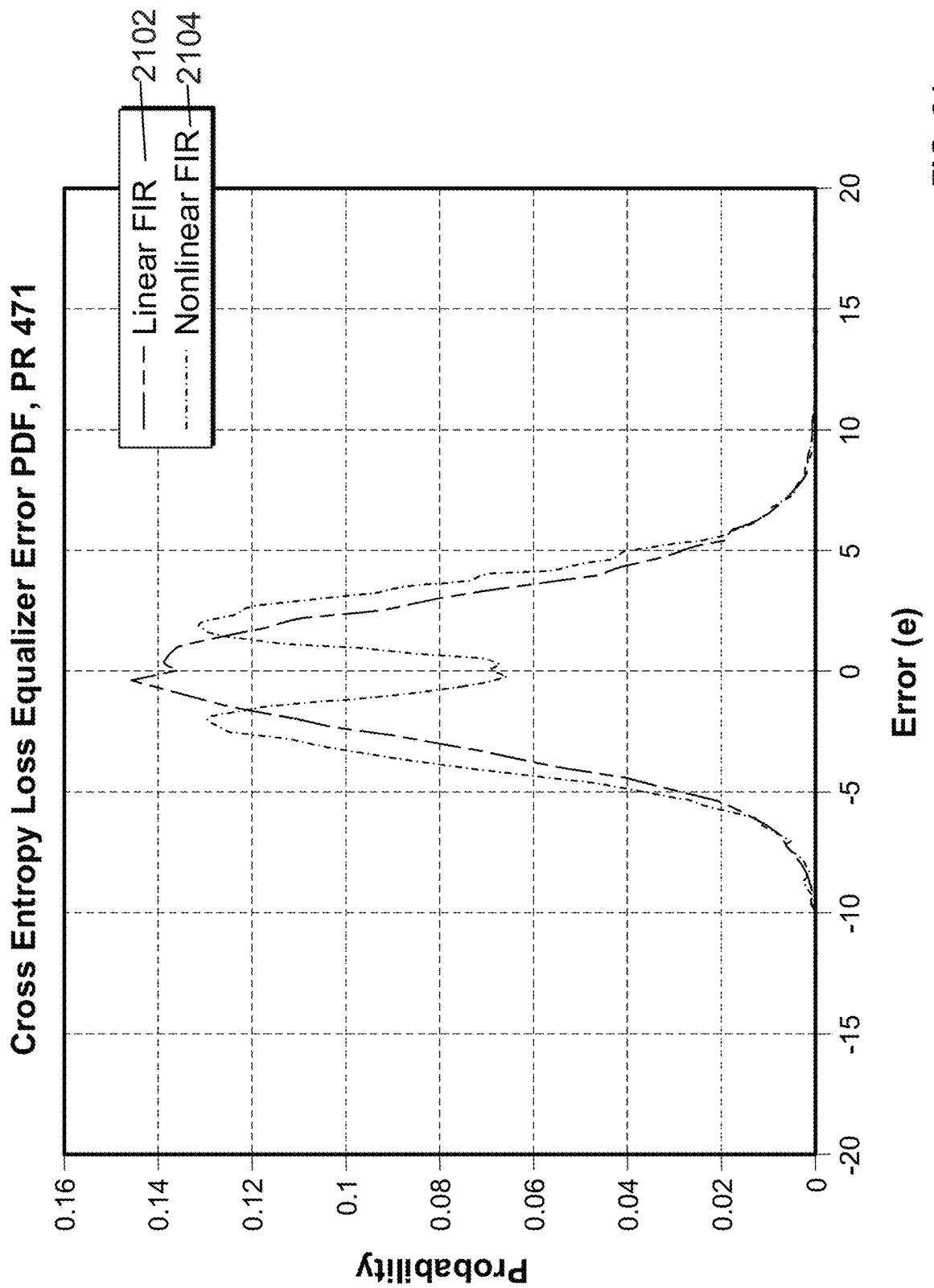
FIG. 21 is a graphical representation of respective probability distribution functions of error samples collected at the outputs of the linear equalizer and the non-linear equalizer, in accordance with an embodiment of the present disclosure.

For a system with a non-linear equalizer (e.g., 902), as demonstrated below, the noise PDF at the output of non-linear equalizer does not necessarily have a single Gaussian PDF. We collected error samples at the output of linear equalizer and non-linear equalizer when CE was used for adaptation criterion. We did not adapt channel estimator coefficients in this test and kept them fixed to [4,7,1,0,0]. FIG. 21 shows the PDFs of these error samples collected at the outputs of the linear equalizer (curve 2102) and the non-linear equalizer (curve 2104), in accordance with an embodiment of the present disclosure. We can see that while the error PDF at the output of the linear equalizer (curve 2102) has a single peak, the error PDF at the output of the non-linear equalizer (curve 2104) has two peaks. Traditional Viterbi algorithms only model a single peak Gaussian PDF for the error while detecting a bit sequence. Accordingly, it would be beneficial to change the model for the noise PDF when a non-linear equalizer is used and adapted using cross-entropy as the cost function. A new modified branch metric (BM) for linear Viterbi is described below to match to this new noise PDF. In some examples, parameters of this modified BM may be adapted using cross-entropy criteria to further improve BER performance.

Figure 22:
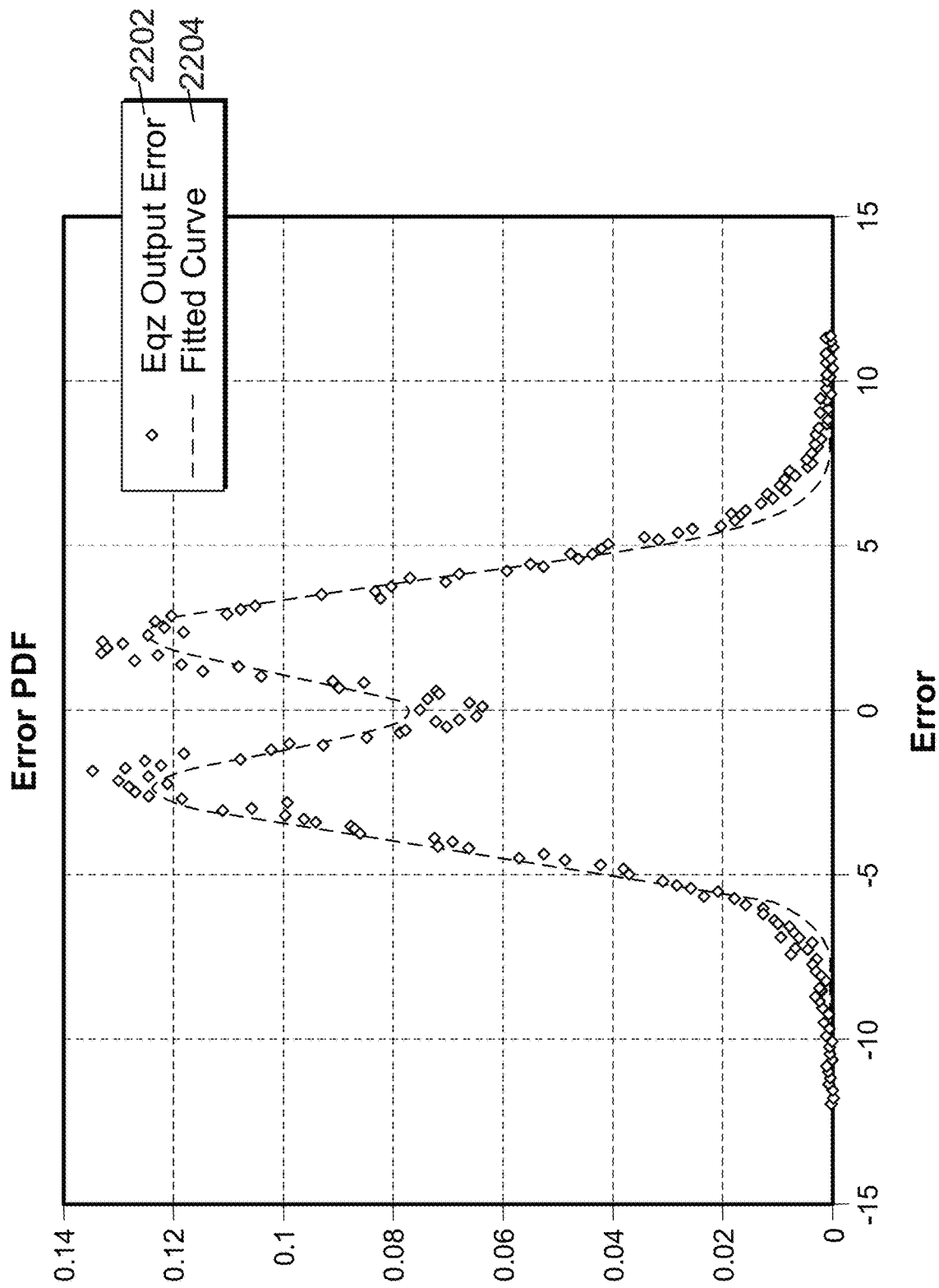
FIG. 22 is a graphical representation of a probability distribution of error samples collected at the output of the non-linear equalizer and a curve fitted using Gaussian Mixture model using two Gaussians and six parameters, in accordance with an embodiment of the present disclosure.

FIG. 22 is a graphical representation of a probability distribution (curve 2202) of error samples collected at the output of the non-linear equalizer and curve 2204 fitted using a general Gaussian mixture model shown below using two Gaussians and six parameters (a, b, c, d, e, f), in accordance with an embodiment of the present disclosure.

$$f1(x)=a^*\exp(-((x-b)/c)^{\wedge}2)+d^*\exp(-((x+e)/f)^{\wedge}2) \quad \text{General model:}$$

Below are the values for the six parameters that have been optimized by utilizing the above model to fit curve 2204 to the noise PDF 2202 at the output of non-linear equalizer.

| Parameter | Value |
|---|---|
| a | 0.1238 |
| b | 2.3330 |
| c | 2.2510 |
| d | 0.1222 |
| e | 2.4660 |
| f | 2.1880 |

This modified noise model fits the noise PDF better than the unmodified single Gaussian noise model, because this modified noise model is fitted to the double Gaussian noise PDF. The modified noise model, therefore, is a better match than the unmodified noise model to be used in a linear Viterbi detector.

Figure 23:
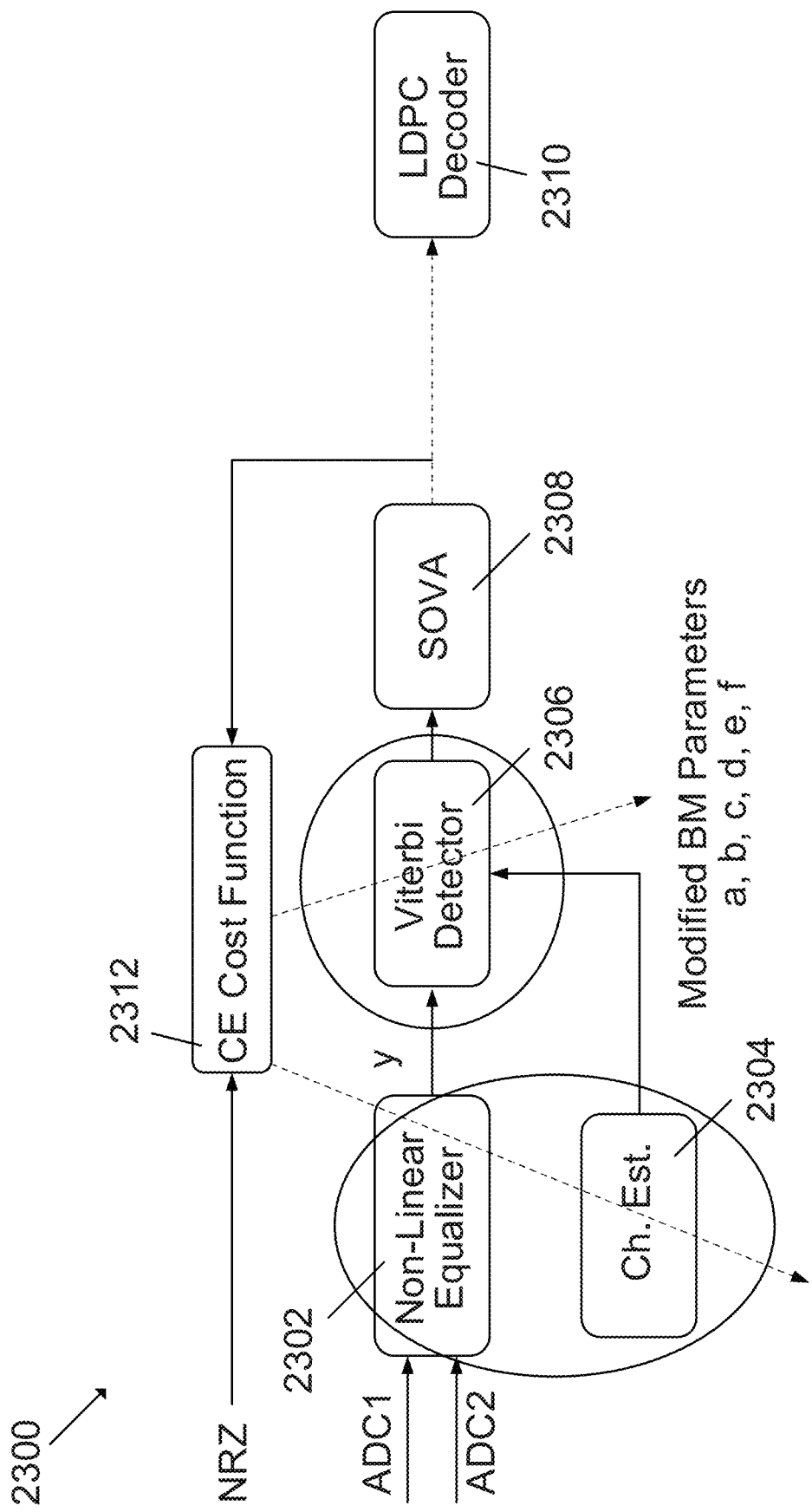
FIG. 23 is schematic representation of a system for adaptation of a non-linear equalizer, a channel estimator, and a Viterbi detector of a TDMR channel, in accordance with an embodiment of the present disclosure.

FIG. 23 is schematic representation of a system 2300 for adaptation of a non-linear equalizer 2302, a channel estimator 2304, and a linear Viterbi detector 2306 of a TDMR channel, in accordance with an embodiment of the present disclosure. System 2300 of FIG. 23 includes many components (e.g., non-linear equalizer 2302, channel estimator 2304, LDPC decoder circuitry 2310) that are the same as or similar to those components included in system 100 (FIG. 1), system 500 (FIG. 5), and/or system 900 (FIG. 9) described above, and such similar components function in manners similar to those described above. Accordingly, rather than repeating the descriptions of such similar components and their functionality, system 2300 of FIG. 23 is described with an emphasis on the differences with respect to systems 100, 500, 900. One such difference is that the cross-entropy cost function circuitry 2312 of system 2300 is configured to also adapt modified BM parameters (a, b, c, d, e, f) used in Viterbi detector 2306.

The modified BM parameters (a, b, c, d, e, f) are adapted in a manner similar to that described above for adapting channel estimation filter tap coefficients and non-linear filter tap coefficients. In particular, using the chain rule, gradients between all intermediate parameters can be computed, and then ultimately a gradient between cross-entropy and modified BM parameters that are being adapted may be computed as shown below.

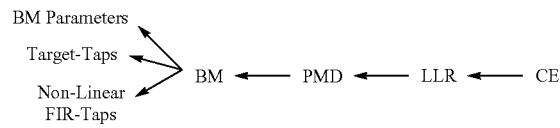

$$\frac{\partial(CE)}{\partial(BM\ \text{Parameters})} = \frac{\partial(BM)}{\partial(BM\ \text{Parameters})} \frac{\partial(PMD)}{\partial(BM)} \frac{\partial(LLR)}{\partial(PMD)} \frac{\partial(CE)}{\partial(LLR)}$$

Figure 24:
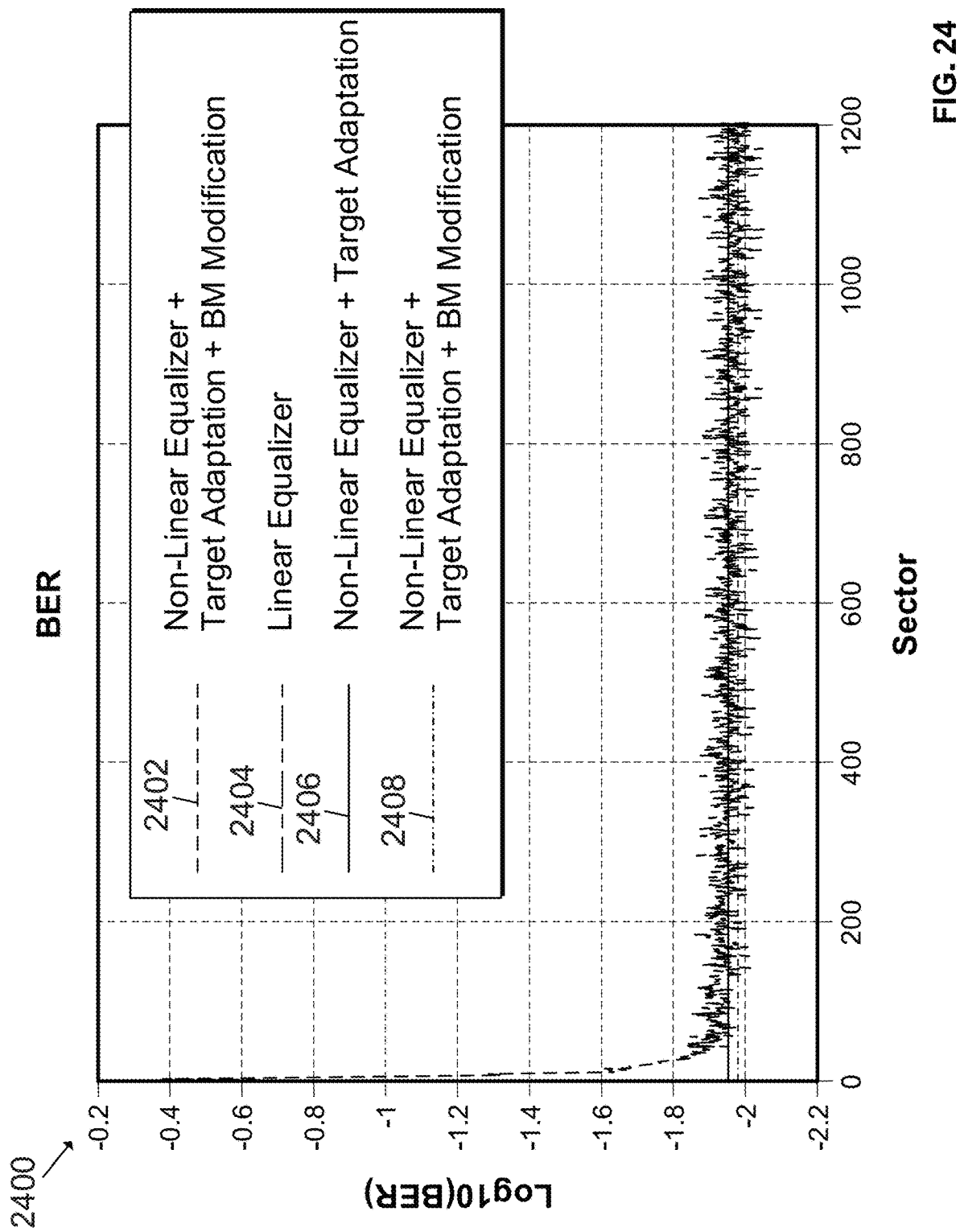
FIG. 24 is a graphical representation of bit error rate performances for various configurations in which one or more of the linear equalizer, the non-linear equalizer, the channel estimator, and/or the Viterbi detector are adapted based on a cross-entropy cost function, in accordance with an embodiment of the present disclosure.

FIG. 24 is a graphical representation 2400 of bit error rate performances for various configurations in which one or more of the linear equalizer, the non-linear equalizer, the channel estimator, and/or the Viterbi detector are adapted based on a cross-entropy cost function, in accordance with an embodiment of the present disclosure. In FIG. 24, curve 2402 shows how BER changes with adaptation when BM is modified with a Gaussian Mixture Model and parameters are adapted using cross-entropy as the cost function. Referring back to FIG. 14, the BER (shown as 2406 in FIG. 24) is shown as being equal to 0.0112 when the BM is not modified. Curve 2408 in FIG. 24 shows the average BER of last 100 sectors of curve 2402, which is equal to 0.0104. Thus, modifying the BM in the manner proposed above achieves an even lower BER than achievable with prior techniques.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure without departing from the scope of the claims.

While operations are depicted in the drawings in a particular order, this is not to be construed as requiring that such operations be performed in the particular order shown or in sequential order, or that all illustrated operations be performed to achieve the desirable results.

What is claimed is:

1. A method for adaptation of a two-dimensional magnetic recording (TDMR) channel, comprising:
    receiving, at an equalizer, read-back signals from respective read sensors of a TDMR channel, the read-back signals corresponding to a digital signal value;
    generating a log-likelihood ratio (LLR) signal based at least in part on the read-back signals;
    computing a cross-entropy value indicative of a mismatch between a probability of detected bit and a probability of the true recorded bit; and
    adapting the equalizer by setting an equalizer parameter to a value that corresponds to a minimum cross-entropy value from among the computed cross-entropy value and one or more previously computed cross-entropy values, to decrease a read-back bit error rate for the TDMR channel.

2. The method for adaptation of a TDMR channel claimed in claim 1, wherein the equalizer comprises a plurality of filter taps having a plurality of coefficients, respectively, and wherein the adapting the equalizer based on the cross-entropy value comprises setting one or more of the plurality of coefficients to one or more respective values that correspond to a minimum cross-entropy value from among the computed cross-entropy value and one or more previously computed cross-entropy values.

3. The method for adaptation of a TDMR channel claimed in claim 1, wherein the read-back signals contain inter-symbol interference (ISI) from data recorded on the media, and wherein the LLR signal is generated by feeding an output of the equalizer through a a soft sequence detector configured to remove inter-symbol interference.

4. The method for adaptation of a TDMR channel claimed in claim 1, wherein generating the LLR signal comprises:
generating branch metrics at a Viterbi detector based on an output of the equalizer; and
generating the LLR signal at a soft output Viterbi algorithm module based on the branch metrics, the LLR signal being a soft output indicative of both a detected digital bit value and a reliability of a likelihood that the detected digital bit value is accurate.

5. The method for adaptation of a TDMR channel claimed in claim 1, wherein computing the cross-entropy value comprises:
receiving, at the equalizer via the read sensors of the TDMR channel, a plurality of read-back signals corresponding to a plurality of digital bit values stored on a recording medium, the plurality of digital bit values representing a set of training data;
computing a plurality of cross-entropy values for the plurality of digital bit values, respectively;
computing an average cross-entropy function based on the plurality of cross-entropy values; and
utilizing the average cross-entropy function as a cost function for the adapting of the equalizer.

6. The method for adaptation of a TDMR channel claimed in claim 1, wherein computing the cross-entropy value comprises computing a gradient of between cross-entropy values and values of coefficients of filter taps of the equalizer.

7. The method for adaptation of a TDMR channel claimed in claim 6, wherein the TDMR channel comprises a branch metric unit (BMU) and a path metric unit (PMU), and wherein computing the gradient between the cross-entropy values and the values of the coefficients of the filter taps of the equalizer comprises computing a gradient between LLR values and values of a path metric difference (PMD) of the PMU, a gradient between the values of the PMD and values of a branch metric (BM) of the BMU, and a gradient between the values of the BM and the values of the coefficients of the filter taps.

8. The method for adaptation of a TDMR channel claimed in claim 7, wherein the BMU comprises a Viterbi detector configured to generate branch metrics based on an output of the equalizer.

9. The method for adaptation of a TDMR channel claimed in claim 8, wherein the PMU is configured to execute a soft output Viterbi algorithm (SOVA) based on the branch metrics to generate the LLR signal, the LLR signal being a soft output indicative of both a decoded digital bit value and a reliability of a likelihood that the decoded digital bit value is accurate.

10. The method for adaptation of a TDMR channel claimed in claim 6, wherein adapting the equalizer based on the cross-entropy value comprises setting one or more of the coefficients to a value that corresponds to a minimum cross-entropy value according to the computed gradient.

11. The method for adaptation of a TDMR channel claimed in claim 1, wherein the read-back signals comprise error-correcting codes and wherein the method further comprises computing, at an error-correcting decoder, the digital signal value based on the error-correcting codes of the read-back signals.

12. The method for adaptation of a TDMR channel claimed in claim 1, wherein the TDMR channel comprises a channel estimation filter having a plurality of filter tap coefficients, and wherein the method further comprises adapting the filter tap coefficients of the channel estimation filter based on the computed cross-entropy.

13. The method for adaptation of a TDMR channel claimed in claim 1, wherein the equalizer is a nonlinear equalizer configured to perform nonlinear equalization upon the read-back signals to reduce non-linear noise originating from non-linear noise sources.

14. The method for adaptation of a TDMR channel claimed in claim 13, wherein the nonlinear equalizer comprises a neural network including a plurality of hidden node layers, with each hidden node layer comprising a plurality of hidden nodes, and wherein the method further comprises executing hyperbolic tangent function activation functions (tanh) at the plurality of hidden nodes.

15. The method for adaptation of a TDMR channel claimed in claim 13, further comprising:
estimating a plurality of bit error rates for a plurality of configurations of the nonlinear equalizer, respectively, each of the plurality of configurations corresponding to a number of hidden node layers having respective numbers of hidden nodes; and
configuring the nonlinear equalizer to have one of the plurality of configurations corresponds to a minimum bit error rate value from among the plurality of bit error rates.

16. The method for adaptation of a TDMR channel claimed in claim 13, further comprising:
generating, based on a probability distribution function (PDF) of noise detected at an output of the nonlinear equalizer, a curve fitting model comprising a plurality of branch metric parameters; and
configuring the curve fitting model to be utilized as a modified branch metric of the BMU.

17. The method for adaptation of a TDMR channel claimed in claim 16, further comprising adapting the values of one or more of the plurality of branch metric parameters to minimize the cross-entropy signal by setting values of the branch metric parameters to values that correspond to a minimum cross-entropy value from among the computed cross-entropy value and one or more previously computed cross-entropy values.

18. The method for adaptation of a TDMR channel claimed in claim 1, wherein the equalizer is configured to perform linear equalization upon the read-back signals to reduce linear noise originating from linear noise sources.

19. A two-dimensional magnetic recording (TDMR) read-back channel, comprising:
equalizer circuitry configured to execute an equalization algorithm upon read-back signals received from respective read sensors, the read-back signals corresponding to a digital signal value;
soft sequence detector for an inter-symbol interference (ISI) channel circuitry configured to generate a log-likelihood ratio (LLR) signal based at least in part on the equalized read-back signals; and
cost function circuitry configured to:
compute a cross-entropy value indicative of a mismatch between a probability of detected bit and a probability of the true recorded bit, and adapt the equalization algorithm by setting an equalizer parameter to a value that corresponds to a minimum cross-entropy value from among the computed cross-entropy value and one or more previously computed cross-entropy values, to decrease a read-back bit error rate for the TDMR channel.

20. The TDMR read-back channel of claim 19, wherein the equalizer circuitry comprises a plurality of filter taps having a plurality of coefficients, respectively, and wherein the cost function circuitry is further configured to adapt the equalization algorithm based on the cross-entropy value by setting one or more of the plurality of coefficients to one or more respective values that correspond to a minimum cross-entropy value from among the computed cross-entropy value and one or more previously computed cross-entropy values.

21. The TDMR read-back channel of claim 19, wherein the read-back signals contain inter-symbol interference (ISI) from data recorded on the media, and wherein the LLR signal is generated by feeding an output of the equalizer through the soft sequence detector for an ISI channel circuitry configured to remove inter-symbol interference.

22. The TDMR read-back channel of claim 19, wherein the soft sequence detector for an ISI channel circuitry comprises Viterbi sequence detector circuitry that includes Viterbi detector circuitry and soft output Viterbi algorithm circuitry, and wherein the soft sequence detector for an ISI channel circuitry is configured to generate the LLR signal by:
  generating branch metrics at a Viterbi detector based on an output of the equalizer; and
  generating the LLR signal at a soft output Viterbi algorithm module based on the branch metrics, the LLR signal being a soft output indicative of both a detected digital bit value and a reliability of a likelihood that the detected digital bit value is accurate.

23. The TDMR read-back channel of claim 19,
  wherein the equalizer is further configured to receive, via the read sensors of the TDMR channel, a plurality of read-back signals corresponding to a plurality of digital bit values stored on a recording medium, the plurality of digital bit values representing a set of training data; and
  wherein the cost function circuitry is further configured to compute the cross-entropy value by:
    computing a plurality of cross-entropy values for the plurality of digital bit values, respectively;
    computing an average cross-entropy function based on the plurality of cross-entropy values; and
    utilizing the average cross-entropy function as a cost function for the adapting of the equalizer.

24. The TDMR read-back channel of claim 19, wherein the cost function circuitry is further configured to compute the cross-entropy value by computing a gradient between cross-entropy values and values of coefficients of filter taps of the equalizer circuitry.

25. The TDMR read-back channel of claim 24, wherein the Viterbi decoder circuitry comprises branch metric unit (BMU) circuitry and path metric unit (PMU) circuitry, and wherein the cost function circuitry is further configured to compute the gradient between the cross-entropy values and the values of the coefficients of the filter taps of the equalizer by computing a gradient between LLR signal values and values of a path metric difference (PMD) of the PMU circuitry, a gradient between the values of the PMD and values of a branch metric (BM) of the BMU circuitry, and a gradient between the values of the BM and values of the coefficients of the filter taps.

26. The TDMR read-back channel of claim 25, wherein the BMU circuitry comprises Viterbi detector circuitry configured to execute a Viterbi detection algorithm by generating branch metrics based on an output of the equalizer circuitry.

27. The TDMR read-back channel of claim 26, wherein the PMU circuitry further comprises soft output Viterbi algorithm (SOVA) circuitry configured to execute the SOVA based on the branch metrics to generate the LLR signal, the LLR signal being a soft output indicative of both a decoded digital bit value and a reliability of a likelihood that the decoded digital bit value is accurate.

28. The TDMR read-back channel of claim 19, wherein the cost function circuitry is further configured to adapt the equalizer based on the cross-entropy value by setting one or more of the coefficients to a value that corresponds to a minimum cross-entropy according to the computed gradient.

29. The TDMR read-back channel of claim 19, wherein the read-back signals comprise error-correcting codes and wherein the TDMR read-back channel further comprises:
  error-correcting decoder circuitry configured to:
    compute the digital signal value based on the error-correcting codes, and
    transmit the digital signal value to the cost function circuitry.

30. The TDMR read-back channel of claim 19, further comprising:
  channel estimation filter circuitry having a plurality of filter tap coefficients,
  wherein the cost function circuitry is further configured to adapt the filter tap coefficients of the channel estimation filter based on the computed cross-entropy.

31. The TDMR read-back channel of claim 19, wherein the equalizer circuitry comprises nonlinear equalizer circuitry configured to perform a nonlinear equalization algorithm upon the read-back signals to reduce non-linear noise originating from non-linear noise sources.

32. The TDMR read-back channel of claim 31, wherein the nonlinear equalizer circuitry comprises a neural network including a plurality of hidden node layers, with each hidden node layer comprising a plurality of hidden nodes, and with each hidden node being configured to execute respective hyperbolic tangent function activation functions (tank).

33. The TDMR read-back channel of claim 31, further comprising:
  bit error rate estimator circuitry configured to:
    estimate a plurality of bit error rates for a plurality of configurations of the nonlinear equalizer circuitry, respectively, the plurality of configurations corresponding to a number of hidden node layers having respective numbers of hidden nodes, and
    configure the nonlinear equalizer to have one of the plurality of configurations that corresponds to a minimum bit error rate value from among the plurality of bit error rates.

34. The TDMR read-back channel of claim 31, further comprising:
  branch metric parameter generation circuitry configured to:
    generate, based on a probability distribution function (PDF) of noise detected at an output of the nonlinear equalizer, a curve fitting model comprising a plurality of branch metric parameters, and configure the curve fitting model to be utilize as a modified branch metric of the BMU.

35. The TDMR read-back channel of claim 34, wherein the cost function circuitry is further configured to adapt the values of one or more of the plurality of branch metric parameters to minimize the cross-entropy signal by setting values of the branch metric parameters to values that correspond to a minimum cross-entropy value from among the computed cross-entropy value and one or more previously computed cross-entropy values.

36. The TDMR read-back channel of claim 19, wherein the equalizer circuitry is further configured to perform a linear equalization algorithm upon the read-back signals to reduce linear noise originating from linear noise sources.

* * * * *